United States Patent
Kaneda et al.

(10) Patent No.: US 11,165,062 B2
(45) Date of Patent: Nov. 2, 2021

(54) POSITIVE ELECTRODE ACTIVE MATERIAL FOR NONAQUEOUS ELECTROLYTE SECONDARY BATTERIES, METHOD FOR PRODUCING SAME, AND NONAQUEOUS ELECTROLYTE SECONDARY BATTERY

(71) Applicant: SUMITOMO METAL MINING CO., LTD., Tokyo (JP)

(72) Inventors: Haruki Kaneda, Niihama (JP); Yuki Koshika, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 479 days.

(21) Appl. No.: 16/328,386

(22) PCT Filed: Aug. 31, 2017

(86) PCT No.: PCT/JP2017/031438
§ 371 (c)(1),
(2) Date: Feb. 26, 2019

(87) PCT Pub. No.: WO2018/043669
PCT Pub. Date: Mar. 8, 2018

(65) Prior Publication Data
US 2021/0280864 A1 Sep. 9, 2021

(30) Foreign Application Priority Data
Aug. 31, 2016 (JP) .............................. JP2016-168693

(51) Int. Cl.
*H01M 4/02* (2006.01)
*H01M 4/525* (2010.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ........................................................ H01M 4/02
See application file for complete search history.

(56) References Cited

U.S. PATENT DOCUMENTS

| 2013/0277604 A1 | 10/2013 | Shimokita et al. |
| 2014/0011090 A1 | 1/2014 | Toya et al. |

(Continued)

FOREIGN PATENT DOCUMENTS

| JP | 2002-151071 A | 5/2002 |
| JP | 2003-077460 A | 3/2003 |

(Continued)

OTHER PUBLICATIONS

International Search Report dated Oct. 10, 2017, issued in counterpart Application No. PCT/JP2017/031438, with English translation (5 pages).

(Continued)

*Primary Examiner* — Jacob B Marks
(74) *Attorney, Agent, or Firm* — Westerman, Hattori, Daniels & Adrian, LLP

(57) ABSTRACT

Provided is a positive electrode active material with which a nonaqueous electrolyte secondary battery can be obtained that achieves both high energy density and output characteristics and thermal stability at the time of short-circuit owing to low conductivity. A positive electrode active material for a nonaqueous electrolyte secondary battery contains a lithium-nickel-manganese composite oxide containing a secondary particle formed of a plurality of flocculated primary particles. The lithium-nickel-manganese composite oxide is represented by General Formula (1): $Li_dNi_{1-a-b-c}Mn_aM_bNb_cO_{2+\gamma}$, at least part of niobium is solid-solved in the primary particles, and a maximum niobium concentra- (Continued)

tion within the primary particles is at least one time and up to three times an average niobium concentration within the primary particles.

12 Claims, 13 Drawing Sheets

(51) Int. Cl.
    *C01G 53/00*     (2006.01)
    *H01M 4/505*     (2010.01)
    *H01M 10/0525*     (2010.01)

(52) U.S. Cl.
    CPC ..... *H01M 10/0525* (2013.01); *C01P 2002/52* (2013.01); *C01P 2004/50* (2013.01); *C01P 2004/61* (2013.01); *C01P 2004/62* (2013.01); *C01P 2004/64* (2013.01); *C01P 2006/40* (2013.01); *H01M 2004/028* (2013.01)

(56) References Cited

U.S. PATENT DOCUMENTS

| | | |
|---|---|---|
| 2015/0194673 A1 | 7/2015 | Takagi et al. |
| 2017/0012288 A1 | 1/2017 | Yamaji et al. |
| 2017/0317339 A1 | 11/2017 | Shimokita et al. |
| 2018/0347069 A1 | 12/2018 | Toya et al. |

FOREIGN PATENT DOCUMENTS

| | | | |
|---|---|---|---|
| JP | 2005-251716 A | | 9/2005 |
| JP | 2008-077990 A | | 4/2008 |
| JP | 2011-108554 A | | 6/2011 |
| JP | 2012-138352 | * | 6/2012 |
| JP | 2013-239434 A | | 11/2013 |
| JP | 2014-038746 A | | 2/2014 |
| JP | 2015-122269 A | | 7/2015 |
| JP | 2015-122298 A | | 7/2015 |
| WO | 2012/131881 A1 | | 10/2012 |
| WO | 2014/034430 A1 | | 3/2014 |
| WO | 2015/115547 A1 | | 8/2015 |

OTHER PUBLICATIONS

International Preliminary Report on Patentability (Form PCT/IB/373) issued in counterpart International Application No. PCT/JP2017/031438 dated Mar. 5, 2019, with Form PCT/ISA/237, with English translation (18 pages).

* cited by examiner

POSITIVE ELECTRODE ACTIVE MATERIAL FOR NONAQUEOUS ELECTROLYTE SECONDARY BATTERIES, METHOD FOR PRODUCING SAME, AND NONAQUEOUS ELECTROLYTE SECONDARY BATTERY

TECHNICAL FIELD

The present invention relates to a positive electrode active material for a nonaqueous electrolyte secondary battery, a method for producing the same, and a nonaqueous electrolyte secondary battery.

BACKGROUND ART

In recent years, with the proliferation of portable electronic equipment such as cellular phones and notebook personal computers, development, of a nonaqueous electrolyte secondary battery with reduced size and weight having high energy density and durability is intensely demanded. Development of a high output secondary battery is intensely demanded as a battery for power tools and electric vehicles including hybrid cars.

Nonaqueous electrolyte secondary batteries such as lithium-ion secondary batteries are secondary batteries satisfying such a demand. A nonaqueous electrolyte secondary battery includes a negative electrode, a positive electrode, and an electrolyte solution; for active materials of the negative electrode and the positive electrode, materials that can de-insert and insert lithium are being used.

Among nonaqueous electrolyte secondary batteries, the research and development of which are currently energetically being conducted, nonaqueous electrolyte secondary batteries containing a layered or spinel type lithium-metal composite oxide as a positive electrode material can obtain as high voltage as 4 V class and are thus being practically used as batteries having high energy density.

For such a positive electrode active material of nonaqueous electrolyte secondary batteries, lithium-metal composite oxides are currently developed such as a lithium-cobalt composite oxide ($LiCoO_2$), which is relatively easily synthesized; a lithium-nickel composite oxide ($LiNiO_2$) and a lithium-nickel-cobalt-manganese composite oxide ($LiNi_{1/3}Co_{1/3}Mn_{1/3}O_2$) containing nickel, which is lower in price than cobalt; and a lithium-manganese composite oxide ($LiMn_2O_4$) and a lithium-nickel-manganese composite oxide ($LiNi_{0.5}Mn_{0.5}O_2$) containing manganese.

Among the positive electrode active materials, in recent years, the lithium-nickel-cobalt-manganese composite oxide ($LiNi_{1/3}Co_{1/3}Mn_{1/3}O_2$), which is excellent in thermal stability and high in capacity, has received attention. The lithium-nickel-cobalt-manganese composite oxide is a layered compound like the lithium-cobalt composite oxide and the lithium-nickel composite oxide and contains nickel, cobalt, and manganese in transition metal sites basically with a composition ratio of 1:1:1.

By the way, presented are techniques that add metals such as tungsten and niobium aiming at obtaining a positive electrode having high performance (high cycle characteristics, high capacity, and high output) as the nonaqueous electrolyte secondary battery.

Patent Literature 1 presents a positive electrode active material for a nonaqueous electrolyte secondary battery containing a composition formed of one or more compounds containing lithium* nickel, cobalt, an element M, niobium, and oxygen indicated by a general formula: $Li_aNi_{1-z-y-x}Co_xM_yNb_xO_b$ (where M is one or more elements selected from the group consisting of Mn, Fe, and Al; $1 \leq a \leq 1.1$, $0.1 \leq x \leq 0.3$, $0 \leq y \leq 0.1$, $0.01 \leq z \leq 0.05$, and $2 \leq b \leq 2.2$), for example. It is said in this presentation that a Li—Nb—O-based compound present near surfaces of particles or therewithin has high thermal stability, and thus a positive electrode active material having high thermal stability and large discharging capacity can be obtained.

Patent Literature 2 presents a positive electrode active material for a nonaqueous electrolyte secondary battery containing a lithium-transition metal composite oxide formed of particles with a polycrystalline structure obtained by a method of production including a mixing process of mixing a nickel-containing hydroxide, a lithium compound, and a niobium compound with an average particle diameter of 0.1 to 10 μm to obtain a lithium mixture and a firing process of firing the lithium mixture in an oxidative atmosphere at 700 to 840° C. to obtain the lithium-transition metal composite oxide, in which the positive electrode active material has a porous structure, has a specific surface area of 0.9 to 3.0 m²/g, and has a content of an alkaline metal other than lithium of up to 20 ppm by mass. It is said that this positive electrode active material can achieve high thermal stability and charging/discharging capacity and excellent cycle characteristics.

Patent Literature 3 presents a positive electrode active material for a nonaqueous electrolyte secondary battery containing a lithium-transition metal composite oxide formed of particles with a polycrystalline structure obtained by a method of production including a niobium covering process of simultaneously adding a niobium salt solution and an acid to slurry of a nickel-containing hydroxide, performing control such that the pH of the slurry is constant in a range of 7 to 11 with 25° C. as a basis to obtain a nickel-containing hydroxide covered with a niobium compound, a mixing process of mixing the nickel-containing hydroxide covered with a niobium compound with a lithium compound to obtain a lithium mixture, and a firing process of firing the lithium mixture in an oxidative atmosphere at 700 to 830° C. to obtain the lithium-transition metal composite oxide, in which the positive electrode active material has a porous structure and has a specific surface area of 2.0 to 7.0 m²/g. It is said that using this positive electrode active material can obtain a nonaqueous electrolyte secondary battery having high safety and battery capacity and excellent cycle characteristics.

Patent Literature 4 presents a positive electrode active material for a nonaqueous electrolyte secondary battery having at least a lithium-transition metal composite oxide with a layered structure, in which the lithium-transition metal composite oxide is present in the form of particles formed of either one or both of primary particles and a secondary particle as a flocculated body thereof, in which the aspect ratio of the primary particle is 1 to 1.8, and has a compound having at least one selected from the group consisting of molybdenum, vanadium, tungsten, boron, and fluorine at least on surfaces of the particles, for example. It is said that having the compound having at least one selected from the group consisting of molybdenum, vanadium, tungsten, boron, and fluorine on the surfaces of the particles improves conductivity.

Patent Literature 5 presents lithium-transition metal-based compound powder for a lithium secondary battery positive electrode material having a lithium-transition metal-based compound having a function of enabling insertion and de-insertion of lithium ions as a main component and formed by adding one compound containing at least one element selected from B and Bi and one compound containing at least, one element, selected from Mo, W, Nb, Ta, and Re in combination to the main component raw material and then firing the mixture. It is said that adding the additional elements in combination and then firing the mixture can obtain lithium-transition metal-based compound powder formed of fine particles in which particle growth and sintering are inhibited and obtain lithium-transition metal-based compound powder with improved rate and output characteristics and easy to handle and prepare an electrode.

Patent Literature 6 presents a positive electrode composition for a nonaqueous electrolyte solution secondary battery containing a lithium-transition metal composite oxide represented by a general formula $Li_aNi_{1-x-y}Co_xM^1_yW_zM^2_wO_2$ ($1.0 \leq a \leq 1.5$, $0 \leq x \leq 0.5$, $0 \leq y \leq 0.5$, $0.002 \leq z \leq 0.03$, $0 \leq w \leq 0.02$, $0 \leq x+y \leq 0.7$; $M^1$ is at least one selected from the group consisting of Mn and Al; and $M^2$ is at least one selected from the group consisting of Zr, Ti, Mg, Ta, Nb, and Mo) and a boron compound containing a boron element and an oxygen element. It is said that using a positive electrode composition containing the lithium-transition metal composite oxide essentially containing nickel and tungsten and a specific boron compound can improve output characteristics and cycle characteristics in the positive electrode composition containing the lithium-transition metal composite oxide.

Also presented is a technique that uses a positive electrode formed of particles having a uniform, appropriate particle diameter and having a hollow structure to obtain high performance (high cycle characteristics, low resistance, and high output) as a battery. Patent Literature 7 presents a positive electrode active material for a nonaqueous electrolyte secondary battery formed of a lithium-nickel-manganese composite oxide represented by a general formula: $Li_{1+u}Ni_xMn_yCo_zM_tO_2$ ($-0.05 \leq u \leq 0.50$, $x+y+z+t=1$, $0.3 \leq x \leq 0.7$, $0.1 \leq y \leq 0.55$, $0 \leq z \leq 0.4$, and $0 \leq t \leq 0.1$; and M is an additional element and is one or more elements selected from Mg, Ca, Al, Ti, V, Cr, Zr, Nb, Mo, and W) and formed of a hexagonal lithium-containing composite oxide having a layered structure and including a hollow structure including a shell part formed of sintered flocculated primary particles having an average particle diameter of 2 to 8 μm and [(d90−d10)/the average particle diameter] as an indicator indicating a spread of particle size distribution of up to 0.60 and a hollow part present therewithin, for example. It is said that this positive electrode active material is high in capacity and favorable in cycle characteristics and enables high output when used for nonaqueous electrolyte secondary batteries.

CITATION LIST

Patent Literature

[Patent Literature 1] Japanese Unexamined Patent Application Publication No. 2002-151071
[Patent Literature 2] Japanese Unexamined Patent Application Publication No. 2015-122298
[Patent Literature 3] International Publication No. 2014/034430
[Patent Literature 4] Japanese Unexamined Patent Application Publication No. 2005-251716
[Patent Literature 5] Japanese Unexamined Patent Application Publication No. 2011-108554
[Patent Literature 6] Japanese Unexamined Patent Application Publication No. 2013-239484
[Patent Literature 7] International Publication No. 2012/131881

SUMMARY OF INVENTION

Technical Problem

However, although the above presentations all improve output characteristics, energy density, and durability, they are insufficient in improvement in thermal stability, and development of a positive electrode active material that satisfies all the characteristics at a high level is demanded.

The nonaqueous electrolyte secondary battery has energy density, output characteristics, and durability as described above and still requires high thermal safety because a nonaqueous electrolyte is contained as a battery material. The lithium-ion secondary battery, for example, requires higher thermal stability because when a short circuit occurs within the battery, heat caused by an abrupt current is generated. It is considered that reducing the conductivity of the positive electrode active material is effective as a way of reducing the abrupt current caused by a short circuit. However, the positive electrode active material having higher conductivity normally tends to improve battery characteristics such as charging/discharging capacity and output characteristics, and it is difficult to achieve both high battery characteristics and low conductivity.

The present invention has been made in view of these circumstances, and an object thereof is to provide a positive electrode active material with which a nonaqueous electrolyte secondary battery can be obtained that achieves both energy density and output characteristics and thermal stability at the time of a short circuit at a high level. Another object of the present invention is to provide a method that can produce such a positive electrode active material easily in production on an industrial scale.

Solution to Problem

The inventor of the present invention intensively studied to solve the above problems and have found out that a specific amount of niobium is added to a lithium-nickel-manganese composite oxide containing a specific amount, of manganese, whereby both improvement in battery characteristics and high thermal stability at the time of a short circuit owing to a reduction in conductivity can be achieved to complete the present invention.

A first aspect of the present invention provides a positive electrode active material for a nonaqueous electrolyte secondary battery containing a lithium-nickel-manganese composite oxide containing a secondary particle formed of a plurality of flocculated primary particles, in which the lithium-nickel-manganese composite oxide is represented by a general formula: $Li_dNi_{1-a-b-c}Mn_aM_bNb_cO_2$ (where M is at least one element selected from Co, W, Mo, V, Mg, Ca, Al, Ti, Cr, Zr, and Ta; and $0.05 \leq a \leq 0.60$, $0 \leq b \leq 0.60$, $0.0003 \leq c \leq 0.03$, and $0.95 \leq d \leq 1.20$), at least part of niobium in the lithium-nickel-manganese composite oxide is solid-solved in the primary particles, and a maximum niobium concentration within the primary particles is at least one time and up to three times an average niobium concentration within the primary particles.

A minimum niobium concentration within the primary particles is preferably at least 50% of the average niobium concentration within the primary particles. A compound containing lithium and niobium is preferably present at least on part of surfaces of the primary particles. A volume average particle diameter MV of the secondary particle is preferably at least 5 μm and up to 20 μm. A degree of circularity E of the secondary particle determined by the following expression is preferably at least 0.60 and up to 0.98.

$$E=4\pi S/L^2 \quad \ldots \text{(Expression)}$$

(in the expression, S is a projected area of the secondary particle, L is a circumferential length of the secondary particle, and π is the ratio of the circumference of a circle to its diameter.)

Conductivity determined by pressed powder resistance measurement is preferably within a range of at least $1.0 \times 10^{-5}$ S/cm and up to $1.0 \times 10^{-2}$ S/cm.

A second aspect of the present invention provides a method for producing a positive electrode active material for a nonaqueous electrolyte secondary battery containing a lithium-nickel-manganese composite oxide represented by a general formula: $Li_d Ni_{1-a-b-c} Mn_a M_b Nb_c O_2$ (where M is at least one element selected from Co, W, Mo, V, Mg, Ca, Al, Ti, Cr, Zr, and Ta; and $0.05 \leq a \leq 0.60$, $0 \leq b \leq 0.60$, $0.0003 \leq c \leq 0.03$, and $0.95 \leq d \leq 1.20$), and containing a secondary particle formed of a plurality of flocculated primary particles, in which at least part of niobium is solid-solved in at least part of the primary particles, the method including a niobium mixing process of preparing a lithium-niobium mixture containing nickel-manganese composite hydroxide particles represented by a general formula: $Ni_{1-a-b} Mn_a M_b (OH)_{2+\alpha}$ (where M is at least one element selected from Co, W, Mo, V, Mg, Ca, Al, Ti, Cr, Zr, and Ta; and $0.05 \leq a \leq 0.60$, $0 \leq b \leq 0.60$, and $0 \leq \alpha \leq 0.4$), a niobium compound, and a lithium compound and a firing process of firing the lithium-niobium mixture in an oxidative atmosphere at at least 750° C. and up to 1,000° C. to obtain the lithium-nickel-manganese composite oxide.

The niobium mixing process can include a crystallization process of obtaining the nickel-manganese composite hydroxide particles by crystallization and a mixing process of mixing the lithium compound and the niobium compound having an average particle diameter of at least 0.01 μm and up to 10 μm with the nickel-manganese composite hydroxide particles to prepare the lithium-niobium mixture. The niobium compound is preferably either one or both of niobic acid and niobium oxide.

The niobium mixing process can include a crystallization process of obtaining the nickel-manganese composite hydroxide particles by crystallization, a niobium covering process of mixing the nickel-manganese composite hydroxide particles and water together to form slurry, simultaneously adding a niobium salt solution and an acid to the slurry such that the pH of the slurry is constant in a range of at least 7 and up to 11 with a liquid temperature of 25° C. as a basis to cover the nickel-manganese composite hydroxide particles with a niobium compound to obtain niobium-covered composite hydroxide particles, and a mixing process of mixing the niobium-covered composite hydroxide particles and the lithium compound together to prepare the lithium-niobium mixture. Before preparing the lithium-niobium mixture, a thermal treatment process of thermally treating the nickel-manganese composite hydroxide particles at a temperature of at least 105° C. and up to 700° C. may be included, and the niobium mixing process may prepare a lithium-niobium mixture containing either or both of nickel-manganese composite hydroxide particles and nickel-manganese composite oxide particles obtained by the thermal treatment, a niobium compound, and a lithium compound.

A third aspect of the present invention provides a method for producing a positive electrode active material for a nonaqueous electrolyte secondary battery containing a lithium-nickel-manganese composite oxide represented by General Formula (1): $Li_d Ni_{1-a-b-c} Mn_a M_b Nb_c O_{2+\gamma}$ (in Formula (1), M is at least one element selected from Co, W, Mo, V, Mg, Ca, Al, Ti, Cr, Zr, and Ta; and $0.05 \leq a \leq 0.60$, $0 \leq b \leq 0.60$, $0.0003 \leq c \leq 0.03$, $0.95 \leq d \leq 1.20$, and $0 \leq \gamma \leq 0.5$) and containing a secondary particle formed of a plurality of flocculated primary particles, in which at least part of niobium is solid-solved in the primary particles, the method including a niobium mixing process of preparing a lithium-niobium mixture containing one or more selected from nickel-manganese composite hydroxide particles represented by General Formula (2): $Ni_{1-a-b} Mn_a M_b (OH)_{2+\alpha}$ (in Formula (2), M is at least one element selected from Co, W, Mo, V, Mg, Ca, Al, Ti, Cr, Zr, and Ta; and $0.05 \leq a \leq 0.60$, $0 \leq b \leq 0.60$, and $0 \leq \alpha \leq 0.4$) and nickel-manganese composite oxide particles represented by General Formula (3): $Ni_{1-a-b} Mn_a M_b O_{1+\beta}$ (in Formula (3), M is at least one element selected from Co, W, Mo, V, Mg, Ca, Al, Ti, Cr, Zr, and Ta; and $0.05 \leq a \leq 0.60$, $0 \leq b \leq 0.60$, and $0 \leq \beta \leq 0.4$); a niobium compound; and a lithium compound and a firing process of firing the lithium-niobium mixture in an oxidative atmosphere at at least 750° C. and up to 1,000° C. to obtain the lithium-nickel-manganese composite oxide.

A fourth aspect of the present invention provides a nonaqueous electrolyte secondary battery including a positive electrode, a negative electrode, a separator, and a nonaqueous electrolyte solution, in which the positive electrode contains the positive electrode active material for a nonaqueous electrolyte secondary battery.

The positive electrode active material for a nonaqueous electrolyte secondary battery of the present invention used for a positive electrode can obtain a nonaqueous electrolyte secondary battery that achieves both high energy density and excellent output characteristics and thermal stability at the time of a short circuit owing to a reduction in conductivity at a high level. The method for producing a positive electrode active material for a nonaqueous electrolyte secondary battery of the present invention can be performed easily even in production on an industrial scale, and thus its industrial value is extremely high.

DESCRIPTION OF EMBODIMENTS

The following describes a positive electrode active material for a nonaqueous electrolyte secondary battery, a method for producing the sane, and a nonaqueous electrolyte secondary battery containing the positive electrode active material about the present embodiment.

1. Positive Electrode Active Material for Nonaqueous Electrolyte Secondary Battery The positive electrode active material for a nonaqueous electrolyte secondary battery according to the present embodiment (hereinafter, also referred to as a "positive electrode active material") contains a lithium-nickel-manganese composite oxide containing a secondary particle formed of a plurality of flocculating primary particles (hereinafter, also referred to as a "lithium-metal composite oxide"). The lithium-metal composite oxide is represented by General Formula (1): $Li_dNi_{1-a-b-c}Mn_aM_bNb_cO_{2+\gamma}$ (in General Formula (1), M is at least one element selected from Co, W, Mo, V, Mg, Ca, Al, Ti, Cr, Zr, and Ta; and $0.05 \leq a \leq 0.60$, $0 \leq b \leq 0.60$, $0.0003 \leq c \leq 0.03$, $0.95 \leq d \leq 1.20$, and $0 \leq \gamma \leq 0.5$), in which at least part of niobium is solid-solved in the primary particles. The lithium-metal composite oxide is formed of particles with a polycrystalline structure.

The positive electrode active material of the present embodiment contains the lithium-metal composite oxide containing a specific amount of niobium (Nb). A nonaqueous electrolyte secondary battery containing the positive electrode active material of the present embodiment (hereinafter, also referred to as a "secondary battery") is extremely low in the reaction resistance of a positive electrode (positive electrode resistance) and has high energy density.

Figure 9A:
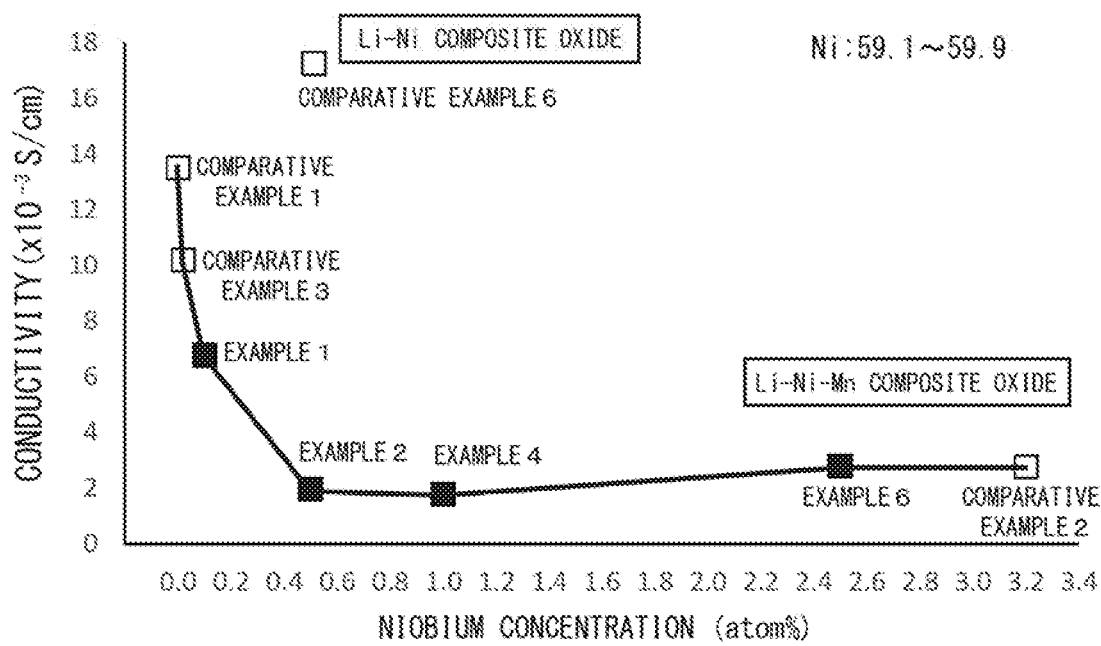
FIGS. 9(A) and 9(B) are graphs of a relation between a niobium content and conductivity FIG. 9(A) or positive electrode resistance FIG. 9(B) for positive electrode active materials obtained in Examples 1, 2, 4, and 5 and Comparative Examples 1 to 3 and 6.
Figure 9B:
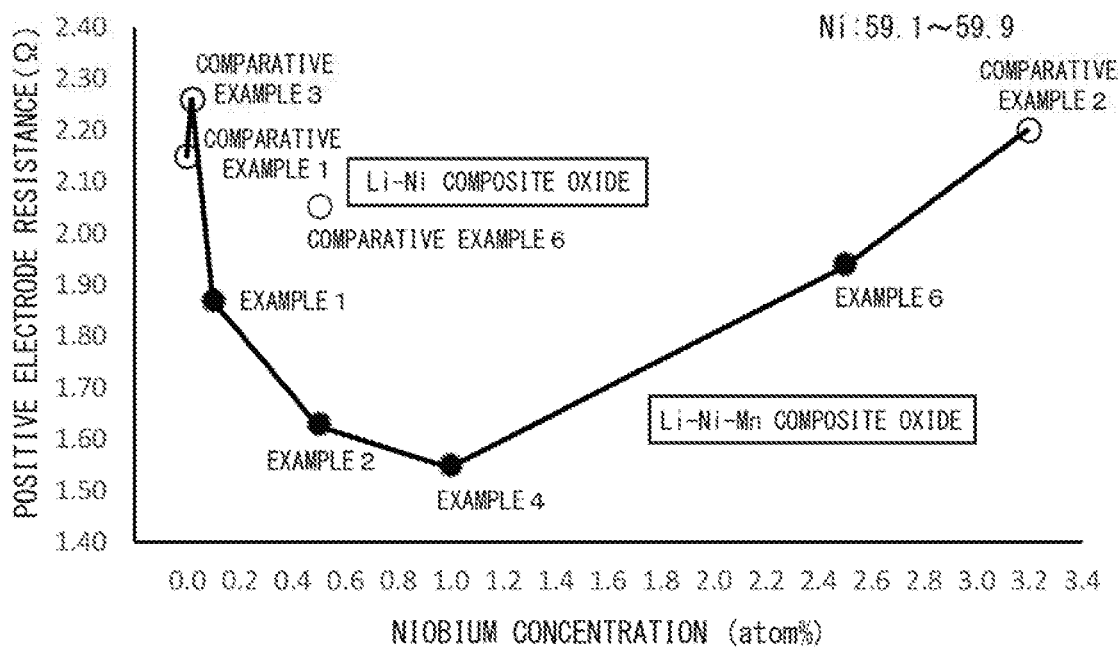

Furthermore, the inventors of the present invention have found out that the positive electrode active material of the present embodiment 1) reduces conductivity and 2) further reduces the reaction resistance (the positive electrode resistance), which is normally considered to increase when conductivity reduces, even though the conductivity of the positive electrode active material reduces (details remain unclear). That is to say, it is normally considered that when the conductivity of the positive electrode active material reduces, electronic conduction resistance increases, and the positive electrode resistance increases to reduce output characteristics and energy density, but such a phenomenon does not occur with the positive electrode active material of the present embodiment. The following describes exemplary relations between a niobium content and conductivity and the positive electrode resistance in the positive electrode active material of the present embodiment with reference to FIG. 9(A) and FIG. 9(B). FIG. 9(A) and FIG. 9(B) are created based on evaluation results of positive electrode active materials and secondary batteries obtained in examples and comparative examples described below.

FIG. 9(A) is a graph of the relation between the niobium content and the conductivity of the positive electrode active materials, whereas FIG. 9(B) is a graph of the relation between the niobium content and the positive electrode resistance of the secondary batteries. As illustrated in FIG. 9(A), the positive electrode active materials containing niobium markedly reduce conductivity compared with the positive electrode active material of Comparative Example 1, which does not contain niobium. As illustrated in FIG. 9(B), the positive electrode active materials containing niobium in a range of at least 0.03 atom % and up to 3 atom % relative to the metals other than lithium reduce the positive electrode resistance compared with the positive electrode active material of Comparative Example 1, which does not contain niobium. The positive electrode active material with a niobium content of 0.02 atom % (Comparative Example 3) slightly reduces conductivity but slightly increases the positive electrode resistance compared with the positive electrode active material of Comparative Example 1. The positive electrode active material with a niobium content of greater than 3 atom % (Comparative Example 2) reduces conductivity but does not obtain the effect of reducing the positive electrode resistance. Thus, the positive electrode active material containing a specific amount of niobium reduces conductivity but can improve the battery characteristics of a secondary battery to be obtained.

When the positive electrode and the negative electrode are short-circuited in the secondary battery, a chain of events occurs, in which a current abruptly passes to generate large amount heat, the positive electrode active material with low thermal stability decomposes, and heat is further generated. Thermal stability at the time of a short circuit can be evaluated by a nail penetration test or a foreign matter short circuit test, for example. When a positive electrode active material with low conductivity like the positive electrode active material of the present embodiment is used for a positive electrode of a secondary battery, the abrupt current increase caused by a short circuit can be inhibited, and thermal stability at the time of a short circuit can be further improved. That is to say, the secondary battery containing the positive electrode active material of the present embodiment can achieve both improvement in output characteristics owing to a reduction in the positive electrode resistance and improvement in thermal stability at the time of a short circuit owing to a reduction in the conductivity of the positive electrode active material.

The positive electrode active material of the present embodiment contains manganese (Mn). Although techniques that, add niobium to the lithium-metal composite oxide are known as described in Patent Literature 1 to 3, for example, there is no report that adding niobium to the lithium-metal composite oxide reduces conductivity. The positive electrode active material of Comparative Example 6 illustrated in FIG. 9(A) and FIG. 9(B) is an example of the lithium-metal composite oxide that contains niobium (Nb) but does not contain manganese (Mn), for example. Although the positive electrode active material of Comparative Example 6 reduces the positive electrode resistance compared with Comparative Example 1, which does not contain niobium, as illustrated in FIG. 9(B), there is no observation of a reduction in conductivity by the addition of niobium as illustrated in FIG. 9(A). Consequently, it can be said that the positive electrode active material of the present embodiment imparts a new effect of improving thermal stability by containing manganese and of reducing the conductivity of the positive electrode active material and reducing output characteristics by containing specific amounts of manganese and niobium in combination.

In General Formula (1), the range of a indicating the content of Mn satisfies $0.05 \leq a \leq 0.60$, preferably $0.10 \leq a \leq 0.55$, more preferably $0.10 \leq a \leq 0.50$, and even more preferably $0.12 \leq a \leq 0.45$. When the value of a is within the above range, excellent output characteristics and high energy density can be obtained, and furthermore high thermal stability can be obtained. As described above, the lithium-metal composite oxide containing Mn and Nb in the above ratios can reduce conductivity and reduce the positive electrode resistance of the secondary battery to be obtained. On the other hand, when the value of a is less than 0.05, the effect of improving thermal stability cannot be obtained. When the value of a is greater than 0.60, output characteristics and energy density reduce.

In General Formula (1), the range of c indicating the content of Nb satisfies $0.0003 \leq c \leq 0.03$. When the range of c is within the above range, a sufficient effect of reducing conductivity can be obtained, and when used for the positive electrode of the secondary battery, the positive electrode resistance reduces, and thus high battery capacity can be obtained. On the other hand, when the value of c is less than 0.0003, the effect of reducing conductivity cannot be obtained. When the value of c is greater than 0.03, segregation of a niobium compound occurs, and output characteristics and battery capacity reduce. Furthermore, in view of obtaining a higher effect of reducing conductivity and improvement in output characteristics, the range of c is preferably $0.0005 \leq c \leq 0.025$ and more preferably $0.001 \leq c \leq 0.02$. The composition of the lithium-metal composite oxide can be measured by quantitative analysis by inductively coupled plasma (TCP) emission spectrometry.

In General Formula (1), M indicating an additional element is at least one element selected from Co, W, Mo, V, Mg, Ca, Al, Ti, Cr, Zr, and Ta, and the range of b indicating the content of M satisfies $0 \leq b \leq 0.60$. When b is greater than 0, thermal stability, storage characteristics, battery characteristics, and the like can be improved. M containing Co, for example, is more excellent in battery capacity and output characteristics. When M is Co, b satisfies preferably $0.05 \leq b \leq 0.5$ and more preferably $0.1 \leq b \leq 0.4$.

In General Formula (1), the content of nickel can be indicated by (1-a-b-c), which satisfies preferably $0 < (1-a-b-c) \leq 0.949$ and more preferably $0.3 \leq (1-a-b-c) \leq 0.943$.

In the positive electrode active material of the present embodiment, at least part of niobium is solid-solved in the primary particles. The mutually contradictory effects of the reduction in the conductivity of the positive electrode active material and the reduction in the positive electrode resistance of the secondary battery described above are surmised to be produced by niobium being solid-solved in the primary particles, although the details are unclear. The solid-solving of niobium refers to a state in which niobium is detected by ICP emission spectrometry and niobium is detected within the primary particles by surface analysis of sections of the primary particles using an energy dispersive X-ray spectrometer (EDX) of a scanning transmission electron microscope (S-TEM), for example, in which niobium is preferably detected across the whole of the primary particles.

A maximum niobium concentration within the primary particles is at least one time and up to three times an average niobium concentration within the primary particles. When the maximum niobium concentration is greater than the above range, variations in a niobium concentration within the primary particles are large, and there are some parts in which the niobium concentration is locally high, whereas there are some parts in which it is locally low. Consequently, parts in which the reaction resistance is high occur in the parts in which the niobium concentration is locally high, whereas parts in which conductivity is high occur in the parts in which the niobium concentration is locally low, which may increase the reaction resistance and increase conductivity in the entire positive electrode active material. In view of obtaining a higher effect of reducing the reaction resistance and a higher effect of reducing conductivity, the maximum niobium concentration is preferably up to two times the average niobium concentration within the primary particles.

Variations in the niobium concentration within the primary particles can be determined by performing line analysis of the composition of sections of the primary particles by EDX measurement of an S-TEM. The ratio of the maximum niobium concentration to the average niobium concentration within the primary particles (the maximum niobium concentration/the average niobium concentration) can be obtained by arbitrarily selecting at least 20 primary particles from a plurality of secondary particles and performing line analysis of the composition within sections of individual primary particles by EDX of S-TEM, for example. Although the direction of the line analysis is preferably performed in a direction giving a maximum length of the sections of the primary particle, the line analysis may be performed in a direction in which analysis for a length of at least 50% of the maximum length is enabled in a case in which the influence of a niobium compound is excluded as described below, for example. From measured values of the niobium concentration of the individual primary particles obtained by the line analysis, the maximum niobium concentration and the average niobium concentration within the primary particles are determined, and the ratios of the maximum niobium concentration (the maximum niobium concentration/the average niobium concentration) of the individual primary particles are each calculated. The values of the ratios of the maximum niobium concentration calculated from the individual primary particles are number-averaged, whereby the ratio of the maximum niobium concentration within the primary particles can be determined. Variations in the niobium concentration are values within the primary particles, and when a niobium compound on the surfaces of the primary particles is recognized by beforehand surface analysis or the like, the line analysis by EDX is performed at a position at which the measured value of the niobium concentration near the surfaces of the primary particles is not influenced by the presence of the niobium compound to measure variations in the niobium concentration.

In view of obtaining the above effect at a higher level, the presence of a part in which the niobium concentration is extremely low is preferably reduced within the primary particles; the minimum niobium concentration within the primary particles is preferably at least 50% relative to the average niobium concentration within the primary particles. Similarly to the above, the minimum niobium concentration within the primary particles can be obtained by arbitrarily selecting at least 20 primary particles from a plurality of secondary particles and performing line analysis on the composition within sections of individual primary particles by EDX of S-TEM and can be determined by number-averaging values of [(the minimum niobium concentration/the average niobium concentration×100] (%) calculated from the primary particles.

As described above, the secondary battery containing the positive electrode active material of the present embodiment, owing to the reduction in the positive electrode resistance, reduces voltage lost within the battery, relatively increases voltage actually applied to a load side, and can thus obtain high output. The voltage applied to the load side increases, whereby lithium insertion/de-insertion in the positive electrode is sufficiently performed, and battery capacity is also improved.

Furthermore, in the positive electrode active material of the present embodiment, a compound containing lithium and niobium (hereinafter, also referred to as a "lithium-niobium compound") may be present on the surfaces of the primary particles. The lithium-niobium compound may be present at least on part of the surfaces of the primary particles or cover the entire surfaces of the primary particles. The lithium-niobium compound can reduce the positive electrode resistance of the secondary battery to be obtained if it is present at least on part of the surfaces of the primary particles. Furthermore, the lithium-niobium compound is preferably fixed to the surfaces of the primary particles.

The lithium-niobium compound is high in lithium ion conductivity and has an effect of facilitating movement of lithium ions, and the lithium-niobium compound formed on the surfaces of the primary particles can form Li conductive paths at the interface between an electrolyte solution and the primary particles. It is considered that, these paths reduce the positive electrode resistance of the secondary battery to be obtained and improve output characteristics. The lithium-niobium compound preferably contains at least one selected from $LiNbO_3$, $LiNb_3O_8$, and $Li_3NbO_4$ and is more preferably $Li_3NbO_4$.

The surfaces of the primary particles on which the lithium-niobium compound is present are preferably surfaces of the primary particles capable of being in contact with the electrolyte solution. The surfaces of the primary particles capable of being in contact with the electrolyte solution not only include surfaces of the primary particles exposed to the outer surface of the secondary particle but also include surfaces of the primary particles near the surface of the secondary particle communicating with the outside of the secondary particle enabling the electrolyte solution to penetrate thereinto and surfaces of the primary particles exposed to voids within the secondary particle. Furthermore, the surfaces of the primary particles capable of being in contact with the electrolyte solution include grain boundaries between the primary particles if bonding between the primary particles is imperfect to enable the electrolyte solution to penetrate thereinto.

The lithium-niobium compound formed on the surfaces of the primary particles capable of being in contact with the electrolyte solution described above can facilitate movement of lithium ions in the positive electrode of the secondary battery. Consequently, the lithium-niobium compound is formed on the surfaces of the primary particles capable of being in contact, with the electrolyte solution, whereby the reaction resistance of the lithium-metal composite oxide can be further reduced. The lithium-niobium compound can be formed by increasing the content of niobium within the above range. When the niobium content is increased within the above range, an average degree of circularity of the secondary particle described below is increased to obtain high energy density, and the lithium-niobium compound is formed on the surfaces of the primary particles to reduce the positive electrode resistance and to maintain favorable positive electrode resistance.

When the lithium-niobium compound is formed in a minute amount, although it is difficult to determine its presence form, excessive lithium present on the surfaces of the primary particles is considered to be an element forming a compound with niobium, and it is estimated that the lithium-niobium compound is formed. The lithium-niobium compound may be present in a crystalline/amorphous mixed form or in an amorphous form. When the lithium-niobium compound is present in a crystalline form, as the amount thereof increases, its presence can be determined by X-ray diffraction measurement.

In either of the presence forms, the lithium-niobium compound, which is surmised to facilitate movement of lithium (Li) between the lithium-nickel-manganese composite oxide and the electrolyte solution, is present at least, on part of the surfaces of the primary particles to obtain the effect of reducing the positive electrode resistance.

The positive electrode active material has a volume average particle diameter MV of preferably at least 5 μm and up to 20 μm and more preferably at least 4 μm and up to 15 μm. When the volume average particle diameter MV is within the above range, when the positive electrode active material is used for the positive electrode of the secondary battery, both high output characteristics and battery capacity and high fillability to the positive electrode can be achieved. When the average particle diameter of the secondary particle is less than 5 μm, high fillability to the positive electrode cannot necessarily be obtained; when the average particle diameter is greater than 20 μm, high output characteristics and battery capacity cannot necessarily be obtained. The average particle diameter can be determined from a volume integral value measured with a laser diffraction/scattering particle size distribution meter, for example.

The secondary particle forming the lithium-metal composite oxide has an average degree of circularity as an indicator of sphericity of preferably at least 0.60 and up to 0.98, more preferably at least 0.65 and up to 0.98, and even more preferably at least 0.70 and up to 0.98. When the average degree of circularity is within this range, the fillability of the secondary particle increases and can impart high energy density (volume energy density) when used for the positive electrode of the battery. Furthermore, the specific surface area increases, and thus the efficiency of contact with the electrolyte solution increases, and output characteristics can be increased. The average degree of circularity can be a larger value (that is to say, the secondary particle can be formed to be more spherical) by increasing the content of niobium. For the average degree of circularity, at least 30 secondary particles are arbitrarily selected, a degree of circularity E of each of the secondary particles is determined by the following expression, and its average can be used, for example. A projected area S and a circumferential length L of each of the secondary particles can be determined by image analysis software (e.g., ImageJ) for a particle with a secondary particle diameter of 1 observed with a SEM with a magnification of 1,000-fold.

$$E = 4\pi S/L^2 \ldots \quad \text{(Expression)}$$

(in the above expression, S is a projected area of the secondary particle, L is a circumferential length of the secondary particle, and π is the ratio of the circumference of a circle to its diameter.)

The positive electrode active material of the present embodiment has a conductivity determined by pressed powder resistance measurement of preferably in a range of at least $1.0\times10^{-5}$ S/cm and up to $1.0\times10^{-2}$ S/cm and more preferably at least $1.0\times10^{-4}$ and up to $1.0\times10^{-2}$ S/cm. Although the positive electrode active material having higher conductivity is normally considered to be a more excellent active material that is low in resistance in an electrochemical reaction, considering thermal stability at the time of a short circuit, conductivity is appropriately reduced, whereby the occurrence of an abrupt current at the time of a short circuit can be inhibited. The positive electrode active material of the present embodiment, with the conductivity being within the above range, can obtain high thermal stability at the time of a short circuit while maintaining excellent output characteristics and high battery capacity when used for the positive electrode of the battery. The conductivity can be determined by weighing the positive electrode active material within a range of at least 4.5 g and up to 5.5 g, and pressure-molding it into a cylindrical shape with a diameter of 20 mm with a load of 20 kN, and then converting the volume resistivity of the mold measured by the resistivity test method by the four-probe method in compliance with JIS K 7154: 1994 while being pressurized, for example.

Figure 1:
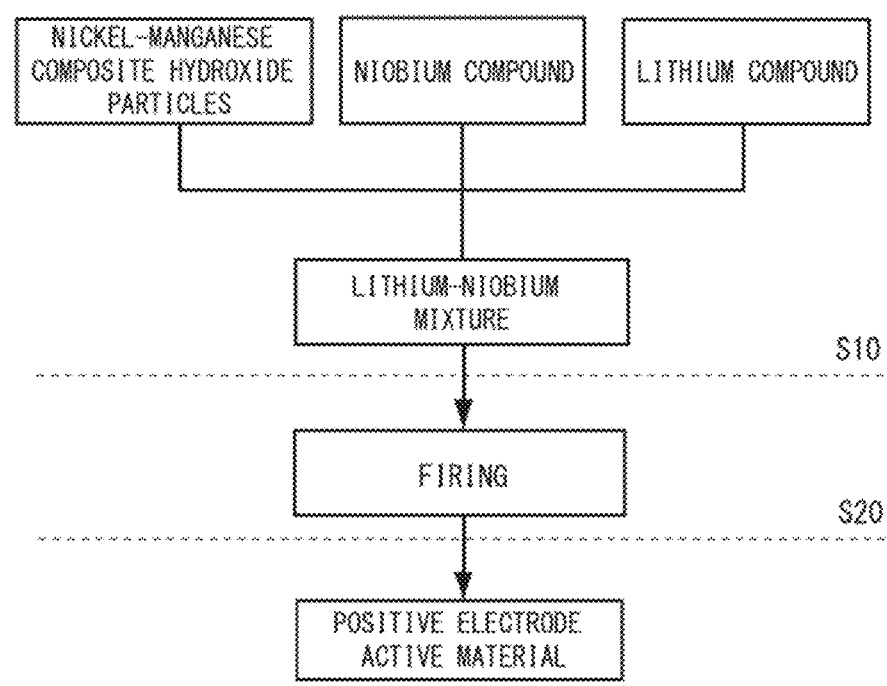
FIG. 1 is a diagram of an exemplary method for producing a positive electrode active material of the present embodiment.

2. Method for Producing Positive Electrode Active Material for Nonaqueous Electrolyte Secondary Battery FIG. 1 is a diagram of an exemplary method for producing a positive electrode active material for a nonaqueous electrolyte secondary battery of the present embodiment (hereinafter, referred to as a "positive electrode active material"). The method of production of the present embodiment can obtain a positive electrode active material containing a lithium-nickel-manganese composite oxide represented by General Formula (1): $Li_dNi_{1-a-b-c}Mn_aM_bNb_cO_{2+\gamma}$ (in Formula (1), M is at least one element selected from Co, W, Mo, V, Mg, Ca, Al, Ti, Cr, Zr, and Ta; and $0.05\leq a\leq 0.60$, $0\leq b\leq 0.60$, $0.0003\leq c\leq 0.03$, $0.95\leq d\leq 1.20$, and $0\leq\gamma\leq 0.5$) containing a secondary particle formed of a plurality of flocculated primary particles, in which at least part of niobium is solid-solved in the primary particles (hereinafter, referred to as a "lithium-metal composite oxide") easily on an industrial scale.

As illustrated in FIG. 1, the method of production of the present embodiment includes a niobium mixing process (Step S10) of preparing a lithium-niobium mixture containing nickel-manganese composite hydroxide particles having a specific composition, a niobium compound, and a lithium compound and a firing process (Step S20) of firing the lithium-niobium mixture in an oxidative atmosphere at at least 750° C. and up to 1,000° C. to obtain the lithium-nickel-manganese composite oxide. The following describes the method for producing a positive electrode active material of the present embodiment with reference to FIG. 1. The following description is an exemplary method of production and is not a limited method of production.

[Niobium Mixing Process]

First, prepared is the lithium-niobium mixture containing the nickel-manganese composite hydroxide particles (hereinafter, also referred to as "composite hydroxide particles"), the niobium compound, and the lithium compound (Step S10). The lithium-niobium mixture can be obtained by adding the niobium compound in the form of powder (solid phase) together with the lithium compound to the composite hydroxide particles to be mixed therewith (refer to FIG. 2), for example. The lithium-niobium mixture can be obtained by simultaneously adding a niobium salt solution and an acid to slurry obtained by mixing the composite hydroxide particles and water together to obtain composite hydroxide particles covered with, a niobium compound and then mixing the lithium compound therewith, for example (refer to FIG. 3). The following describes the details of the niobium mixing process (Step S10) with reference to FIGS. 1 to 3.

The composite hydroxide particles contained in the lithium-niobium mixture are represented by General Formula (2): $Ni_{1-a-b}Mn_aM_b(OH)_{2+\alpha}$ (in Formula (2), M is at least one element selected from Co, W, Mo, V, Mg, Ca, Al, Ti, Cr, Zr, and Ta; and $0.05\leq a\leq 0.60$, $0\leq b\leq 0.60$, and $0\leq\alpha\leq 0.4$). The contents (composition) of the metals (Ni, Mn, and M) in the composite hydroxide particles is almost maintained in the lithium-metal composite oxide, and the contents of the respective metals (Ni, Mn, and M) are preferably within ranges similar to those of the contents in the lithium-metal composite oxide described above.

For the composite hydroxide particles, nickel composite hydroxide particles containing at least manganese in the above range are used. With this composition, manganese can be uniformly distributed within a plurality of primary particles of the positive electrode active material to be obtained. The positive electrode active material in which manganese and niobium are contained (solid-solved) within the primary particles has high thermal stability and reduces conductivity. Manganese is contained within the primary particles, whereby the lithium-niobium mixture can be fired at a relatively high temperature. Firing at a high temperature can solid-solve niobium in the niobium compound in the primary particles more uniformly. The method for producing the composite hydroxide particles is not limited to a particular method; as illustrated in FIG. 2 and FIG. 3, composite hydroxide particles obtained by a crystallization process (Step S11) are preferably used.

The composite hydroxide particles contain nickel and manganese each uniformly within these particles; in the case of a mixture in which nickel hydroxide particles and a manganese compound are mixed together or nickel hydroxide particles covered with a manganese compound, for example, the distribution of manganese in the positive electrode active material to be obtained is nonuniform, which cannot necessarily sufficiently produce the effect, obtained by containing manganese.

Figure 2:
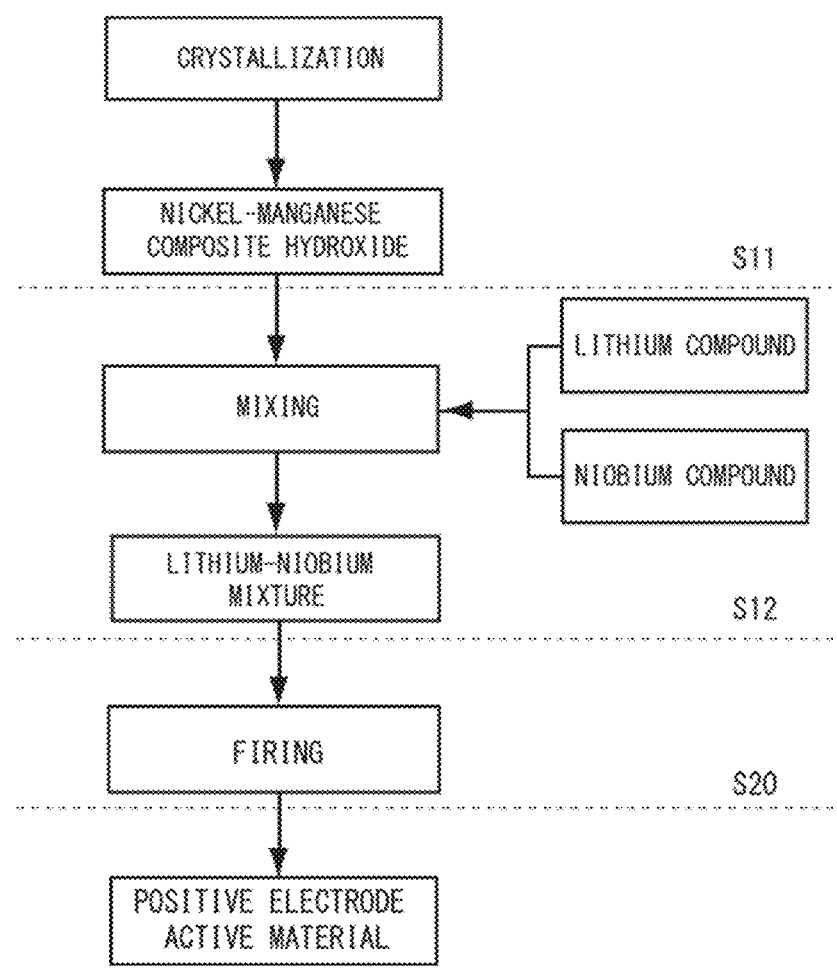
FIG. 2 is a diagram of an exemplary method for producing the positive electrode active material of the present embodiment.
Figure 3:
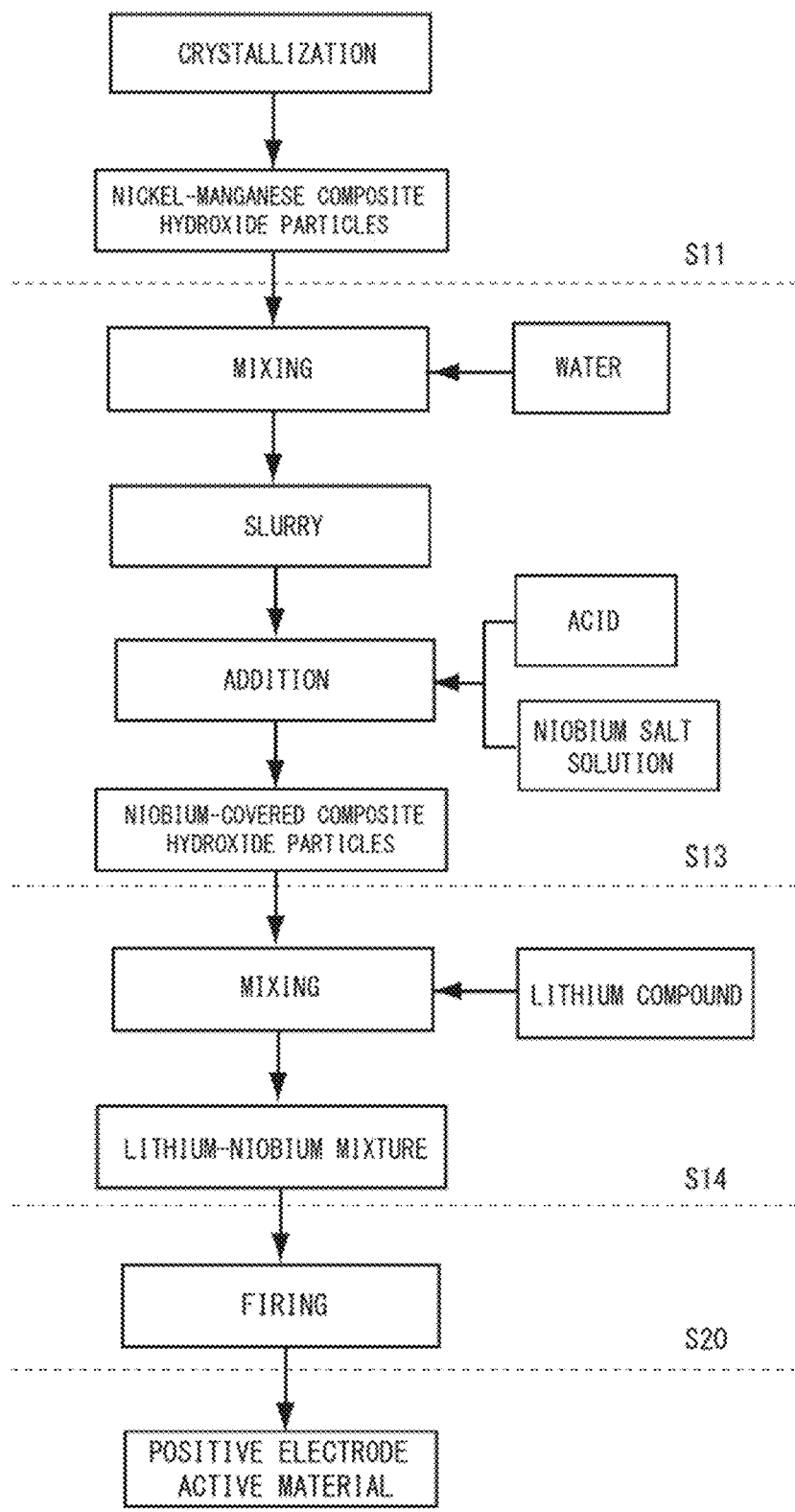
FIG. 3 is a diagram of an exemplary method for producing the positive electrode active material of the present embodiment.

As illustrated in FIG. 2, the niobium mixing process (Step S10) includes the crystallization process (Step S11) of obtaining the composite hydroxide particles by crystallization and a mixing process (Step S12) of mixing the obtained composite hydroxide particles, the lithium compound, and the niobium compound together to prepare the lithium-niobium mixture, for example. The following describes the processes.

(Crystallization Process)

The method of production of the present embodiment relates to a positive electrode active material that improve thermal stability by containing manganese and reduces the conductivity of the positive electrode active material by containing manganese and niobium in combination. Given these circumstances, the crystallization process (Step S11) can be performed by any known method so long as it obtains the composite hydroxide particles having the above manganese content; in a reaction tank, a mixed aqueous solution containing at least nickel and manganese is stirred at a constant speed, and a neutralizer is added thereto to perform neutralization and to control pH, whereby the composite hydroxide particles can be formed through coprecipitation, for example.

For the mixed aqueous solution containing nickel and manganese, a sulfate solution, a nitrate solution, and chloride solution of nickel and manganese can be used, for example. As described below, the mixed aqueous solution may contain an additional element M. The composition of the metal elements contained in the mixed aqueous solution nearly matches the composition of the metal elements contained in the composite hydroxide particles to be obtained. Given these circumstances, the composition of the metal elements of the mixed aqueous solution can be adjusted so as to be the same as the target composition of the metal elements of the composite hydroxide particles. For the neutralizer, an alkaline aqueous solution can be used; sodium hydroxide, potassium hydroxide, or the like can be used, for example.

A complexing agent is preferably added to the mixed aqueous solution together with the neutralizer. The complexing agent is not limited to a particular agent so long as it bonds to nickel ions and ions of other metals to be able to form a complex in an aqueous solution within the reaction tank (hereinafter, referred to as a "reaction aqueous solution"), and known agents can be used; examples thereof include an ammonium ion supplier. The ammonium ion supplier is not limited to a particular substance; examples thereof include ammonia, ammonium sulfate, ammonium chloride, ammonium carbonate, and ammonium fluoride. By adding the complexing agent, the solubility of metal ions in the reaction aqueous solution can be adjusted.

When the complexing agent, is not used at the crystallization process (Step S11), the reaction aqueous solution preferably has a temperature (liquid temperature) of within a range of greater than 60° C. and up to 80° C., and the pH of the reaction aqueous solution at the above temperature is preferably at least 10 and up to 12 (with 25° C. as a basis). When the pH of the reaction aqueous solution is greater than 12, the composite hydroxide particles to be obtained are fine particles, filterability is bad, and spherical particles cannot necessarily be obtained. When the pH of the reaction aqueous solution is less than 10, the formation rate of the composite hydroxide particles markedly reduces, Ni remains in a filtrate, the precipitation amount of Ni deviates from a target composition, and a composite hydroxide with a target ratio cannot necessarily be obtained.

When the temperature of the reaction aqueous solution is greater than 60° C., the solubility of Ni increases, and a phenomenon in which the precipitation amount of Ni deviates from the target composition not leading to coprecipitation can be avoided. When the temperature of the reaction aqueous solution is greater than 80° C., the amount of evaporation of water is large to increase slurry concentration (the concentration of the reaction aqueous solution), the solubility of Ni reduces, crystals of sodium sulfate and the like occur in the filtrate, and an impurity concentration increases, which may reduce the charging/discharging capacity of the positive electrode active material.

When the ammonium ion supplier (the complexing agent) is used at the crystallization process (Step S11), the temperature of the reaction aqueous solution is preferably at least 30° C. and up to 60° C. because the solubility of Ni in the reaction aqueous solution increases, and the pH of the reaction aqueous solution is preferably at least 10 and up to 13 (with 25° C. as a basis).

The ammonia concentration in the reaction aqueous solution is preferably held at a constant value within a range of at; least 3 g/L and up to 25 g/L. When the ammonia concentration is less than 3 g/L, the solubility of metal ions cannot be held constant, and the primary particles of the composite hydroxide uniform in shape and particle diameter are not necessarily formed. In addition, gel-like nuclei are likely to be formed, and the particle size distribution of the composite hydroxide particles to be obtained is likely to be widened. When the ammonia concentration is greater than 25 g/L, the solubility of metal ions is extremely high, the amount of metal ions remaining in the reaction aqueous solution increases, and composition deviation or the like of the composite hydroxide particles to be obtained is likely to occur. When the ammonia concentration fluctuates, the solubility of metal ions fluctuates, and uniform hydroxide particles are not formed; the ammonia concentration is preferably-held at a constant value. The ammonia concentration is preferably held at a desired concentration with a range between the upper limit and the lower limit of about 5 g/L, for example.

The crystallization process (Step S11) may use batch type crystallization or use continuous crystallization. In the case of the batch type crystallization, for example, the reaction aqueous solution within the reaction tank becomes a stationary state, then a precipitate is collected, filtered, and washed with water to obtain the composite hydroxide particles. In the case of the continuous crystallization, an aqueous solution containing the mixed aqueous solution, an alkaline aqueous solution, and optionally the ammonium ion supplier is continuously supplied and is overflowed from the reaction tank, and a precipitate is collected, filtered, and washed with water to obtain the composite hydroxide particles.

The composite hydroxide particles may contain at least one element selected from Co, W, Mo, V, Mg, Ca, Al, Ti, Cr, Zr, and Ta (hereinafter, referred to as an "additional element M") as indicated in General Formula (2). The method for adding the additional element M to the composite hydroxide particles is not limited to a particular method, and known methods can be used; in view of improving productivity, for example, a preferred method adds an aqueous solution containing the additional element M to the mixed aqueous solution containing nickel and manganese and coprecipitates composite hydroxide particles containing the additional element M.

Examples of the aqueous solution containing the additional element M include aqueous solutions containing cobalt sulfate, sodium tungstate, tungsten oxide, molybdenum oxide, molybdenum sulfate, vanadium pentaoxide, magnesium sulfate, magnesium chloride, calcium chloride, aluminum sulfate, sodium aluminate, titanium sulfate, ammonium peroxotitanate, titanium potassium oxalate, zirconium hydroxide, zirconium sulfate, chromium chloride, sodium tantalite, and tantalic acid.

In view of optimizing the crystallization condition to make the control, of the composition ratio easy, after the composite hydroxide particles are obtained by crystallization, a process of covering the obtained composite hydroxide particles with M may be further provided. The method of covering with the additional element M is not limited to a particular method, and known methods can be used.

The following describes an example of the method of covering with the additional element M. First, the composite hydroxide particles obtained by crystallization are dispersed in pure water to make slurry. Next, a solution containing M corresponding to a target covering amount is mixed with this slurry, and an acid is added dropwise thereto so as to give a certain pH to adjust it. Examples of the acid include sulfuric acid, hydrochloric acid, and nitric acid. Next, the slurry is mixed for a certain period of time and is filtered and dried, whereby composite hydroxide particles covered with the additional element M can be obtained. Examples of other methods of covering include spray drying, in which a solution containing a compound containing M is sprayed onto the composite hydroxide particles and is then dried, and a method that impregnates the composite hydroxide particles with a solution containing a compound containing M.

The method for adding the additional element M to the composite hydroxide particles may include either one or both of adding the additional element M to the above mixed aqueous solution and covering the composite hydroxide particle with the additional element M; 1) a nickel-containing hydroxide crystallized by adding an alkaline aqueous solution to a mixed aqueous solution containing nickel and manganese (however, except the additional element M) may be covered with the additional element M or 2) a mixed aqueous solution containing nickel, manganese, and part of the additional element M is prepared, nickel-manganese composite hydroxide particles (including the additional element M) are coprecipitated, and further the coprecipitate may be covered with the additional element M to adjust the content of M, for example.

(Mixing Process)

The mixing process (Step S12) is a process of mixing the composite hydroxide particles obtained as described above, the niobium compound, and the lithium compound together to obtain the lithium-niobium mixture.

For the niobium compound, known compounds containing niobium can be used; examples thereof include niobic acid, niobium oxide, niobium nitrate, niobium pentachloride, and niobium nitrate, and among these, in view of availability and preventing impurities from being mixed into the lithium-metal composite oxide, the niobium compound is preferably niobic acid, niobium oxide, or a mixture thereof. When impurities are mixed into the lithium-metal composite oxide, the secondary battery to be obtained may reduce thermal stability, battery capacity, and cycle characteristics.

The niobium compound is preferably mixed in the form of particle (solid phase). When niobium is added as a solid phase, reactivity at the later firing process (Step S20) changes depending on the particle diameter of the niobium compound, and the particle diameter of the niobium compound to be used is one of the important elements. The average particle diameter of the niobium compound is preferably at least 0.01 μm and up to 10 μm, more preferably at least 0.05 μm and up to 3.0 μm, and even more preferably at least 0.08 μm and up to 1.0 μm. The average particle diameter being less than 0.01 μm may cause a problem in that handling of the powder is extremely difficult or a problem in that the niobium compound scatters at the mixing process (Step S12) and the firing process (Step S20), and a target, composition cannot be added to the active material. When the average particle diameter is greater than 10 μm, Nb is not uniformly distributed in the lithium-transition metal composite oxide after firing, and thermal stability cannot necessarily be ensured. The average particle diameter is a volume average particle diameter MV and can be determined from a volume integral value measured with a laser diffraction/scattering particle size distribution meter, for example.

The niobium compound may be crushed in advance so as to give a particle diameter within the above range using various kinds of crushers such as a ball mill, a planetary ball mill, a jet mill, a nano jet mill, a beads mill, and a pin mill. The niobium compound may be classified with a dry classifier or by sieving as needed. Sieving can obtain particles with nearly 0.01 μm, for example.

The lithium compound is not limited to a particular compound, and known compounds containing lithium can be used; examples thereof include lithium carbonate, lithium hydroxide, lithium nitrate, and mixtures thereof. Among these, in view of less influence of remaining impurities and being dissolved at a firing temperature, preferred are lithium carbonate, lithium hydroxide, and mixtures thereof.

The method for mixing the composite hydroxide particles, the lithium compound, and the niobium compound together is not limited to a particular method, and the composite hydroxide particles, the lithium compound, and the niobium compound may be sufficiently mixed together to the extent that the skeleton of the composite hydroxide particles and the like is not destroyed. As to the method of mixing, mixing can be performed using general mixers, for example; mixing can be performed using a shaker mixer, a Loedige mixer, a Julia mixer, or a V blender, for example The lithium-niobium mixture is preferably sufficiently mixed before the firing process (Step S20) described below. Insufficient mixing may cause a problem in that a ratio (Li/Me) between Li and metal elements Me other than Li varies among individual particles of the positive electrode active material, and sufficient battery characteristics cannot be obtained.

The lithium compound is mixed such that Li/Me in the lithium-niobium mixture is at least 0.95 and up to 1.20. In other words, the lithium compound is mixed such that Li/Me in the lithium-niobium mixture is the same as Li/Me in the positive electrode active material to be obtained. This is because Li/Me and the molar ratios of the respective metal elements do not change before and after the firing process (Step S20), and Li/Me of the lithium-niobium mixture at this mixing process (Step S12) is Li/Me of the positive electrode active material. The niobium compound is mixed such that a niobium content in the lithium-niobium mixture is at least 0.03 atom % and up to 3atom % relative to the sum of the metal elements other than Li (Ni, Mn, the additional element M, and Mb) in the lithium-niobium mixture.

Furthermore, as illustrated in FIG. 3, the niobium mixing process (Step S10) may include the crystallization process (Step S11) of obtaining the composite oxide particles by crystallization, a niobium covering process (Step S13) of adding a niobium salt solution and an acid to slurry obtained by mixing the obtained composite hydroxide particles and water together to obtain composite hydroxide particles covered with a niobium compound, and a mixing process (Step S14) of mixing the composite hydroxide particles covered with a niobium compound and a lithium compound together to obtain a lithium-niobium mixture, for example. The following describes the processes. The crystallization process (Step S11) is a process similar to the above, and a description thereof is omitted.

(Niobium Covering Process)

The niobium covering process (Step S13) is a process of covering the composite hydroxide particles obtained at the crystallization process (Step S11) with a niobium compound. Covering with the niobium compound is performed by adding the niobium salt solution and the acid to the slurry obtained by mixing the composite hydroxide particles and water together to crystallize a niobium compound (e.g., a hydroxide of niobium) on surfaces of the composite hydroxide particles, for example. Such a method for producing niobium-covered composite hydroxide particles is described in WO 2014/034430, for example, and detailed conditions can be adjusted as appropriate by referring to the document or the like.

The niobium salt solution is not limited to a particular solution so long as it is a solution containing a niobium salt having sufficiently high solubility to water; preferred examples thereof include an aqueous solution in which at least one of niobium hydroxide, niobium metal, and niobium pentachloride is dissolved in an aqueous potassium hydroxide solution and a solution in which at least one of niobium hydroxide and niobium pentachloride is dissolved in hydrochloric acid. To obtain the niobium salt solution with a certain concentration, ferroniobium may be dissolved in a potassium hydroxide solution.

The niobium salt solution is preferably produced by dissolving the niobium salt in an aqueous potassium hydroxide solution having a potassium hydroxide concentration of at least 150 g/L and up to 500 g/L and a temperature of within a range of greater than 60° C. and up to 90° C. When the concentration of potassium hydroxide is less than 150 g/L, niobium cannot sufficiently be dissolved, and niobium remains in a residue. When the concentration of potassium hydroxide is greater than 500 g/L, it is close to the saturated concentration of potassium hydroxide, and niobium cannot be dissolved therein. When the temperature during dissolution is lower than 60° C., reactivity reduces to take a long time for dissolution. When the temperature is 90° C. or higher, reactivity increases, but the amount of evaporation of water is large, and besides, there is a danger that reaction proceeds vigorously to cause bumping. A niobium salt concentration in the niobium salt solution is preferably at least 5 g/L and up to 40 g/L. When the niobium salt solution is within the above range, the productivity of the composite hydroxide particles covered with a niobium compound can be increased.

Ferroniobium is not limited to any particular shape such as powdery, particulate, or lumpy one and is not limited to a particular one so long as it is generally available. The reaction condition for dissolving ferroniobium preferably includes a potassium hydroxide concentration of 150 to 500 g/L and a range of greater than 60° C. and up to 90° C., although the optimum condition somewhat varies depending on a desired niobium concentration. When ferroniobium is dissolved under the above condition, iron can be left in a residue, and this residue is filtered out to obtain a niobium salt solution dissolving only niobium.

When ortho-niobate ($M_3NbO_4$: M is a monovalent element other than Nb and O) or meta-niobate ($MNbO_3$: M is a divalent element other than Nb and O) is used as the niobium salt for producing the niobium salt solution, when it is tried to be dissolved to obtain the niobium salt solution, it may be hardly dissolved, because hydrolysis or oxidation during dissolution proceeds, which produces niobium hydroxide or insoluble niobium oxide.

The method for adding the niobium salt solution and the acid to the slurry obtained by mixing the composite hydroxide particles and water together is not limited to a particular method, and known methods can be used; while the obtained slurry is stirred, the niobium salt solution and the acid can be simultaneously added thereto so as to give a certain pH, for example. The pH (with 25° C. as a basis) in this process is preferably at least 7 and up to 11 and more preferably at least 7 and less than 9. When the pH is within the above range, metal components in the composite hydroxide particles can be inhibited from being dissolved, and the surfaces of the composite hydroxide particles can be covered with the niobium compound more uniformly. Adding the niobium salt solution and the acid simultaneously produces an effect of making it difficult for niobium hydroxide and the like to precipitate and flocculate as a single body and making it possible for the surface of the composite hydroxide to be uniformly coated.

The acid is not limited to a particular acid, and known acids can be used; in view of being low in price and being easy to be industrially used, preferred are sulfuric acid, hydrochloric acid, and the like. The concentration of the acid to be added is preferably at least 10% by mass and up to 50% by mass relative to the entire acid aqueous solution.

(Thermal Treatment Process)

Figure 4:
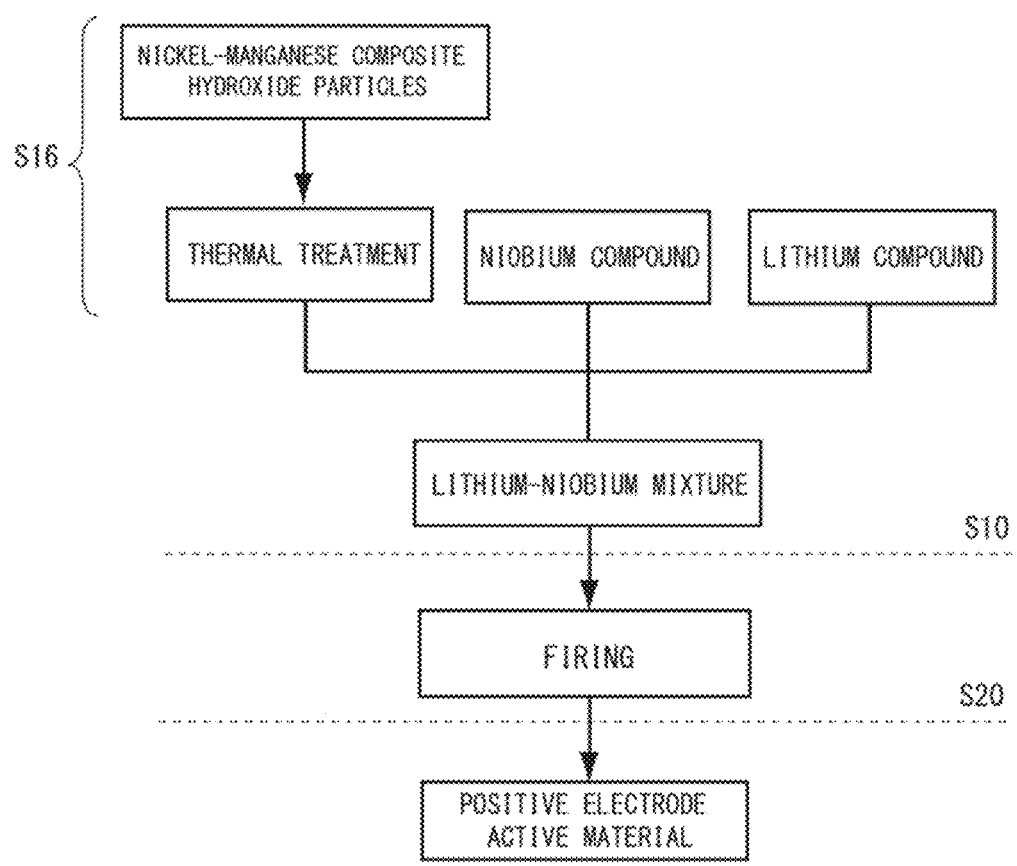
FIG. 4 is a diagram of an exemplary method for producing the positive electrode active material of the present embodiment.
Figure 5:
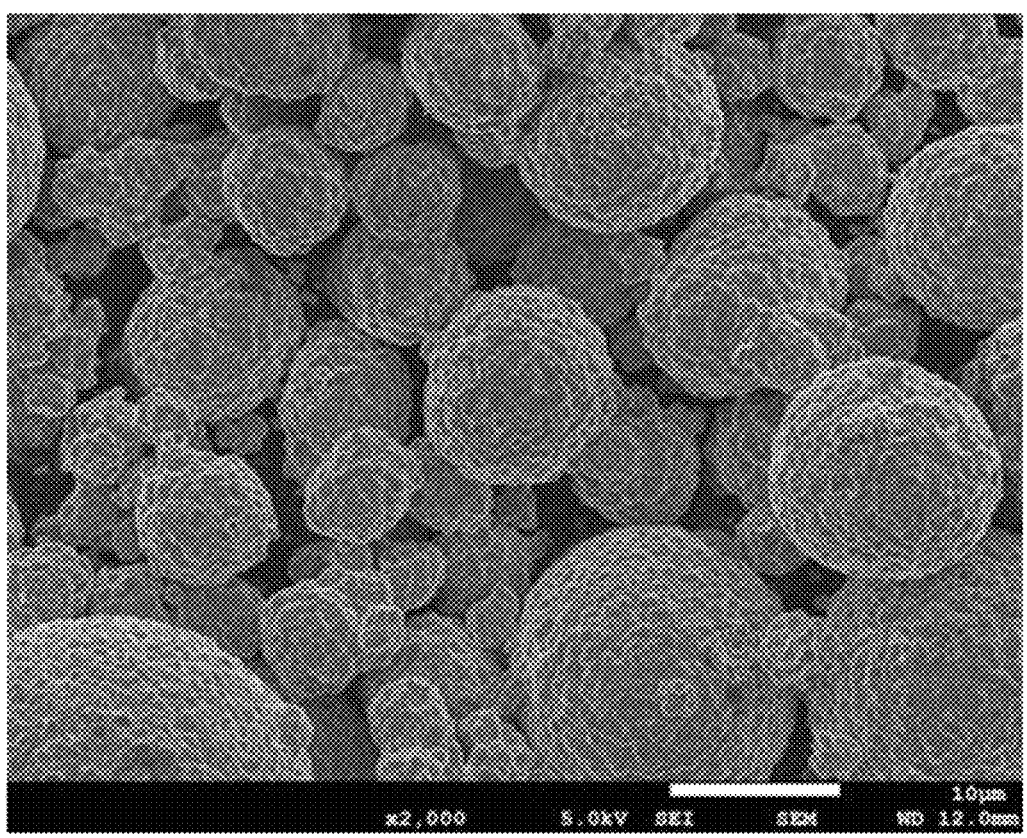
FIG. 5 is a diagram of a scanning electron microscope (SEM) image of a positive electrode active material obtained in Example 2.
Figure 6:
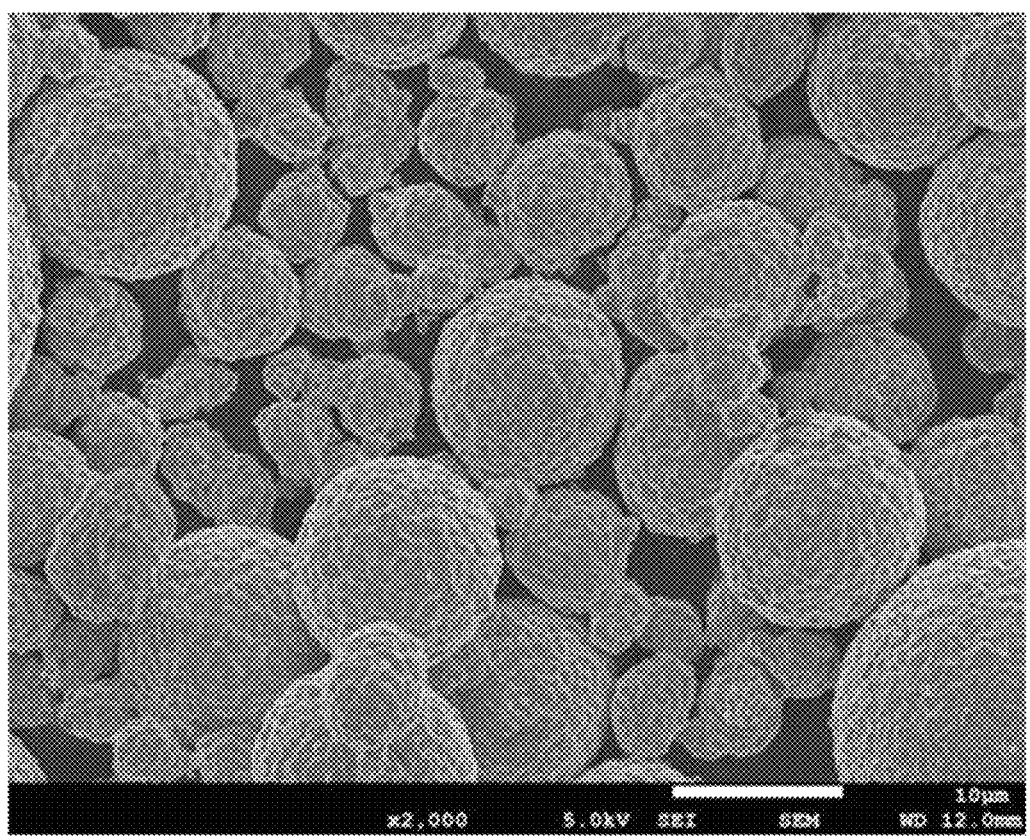
FIG. 6 is a diagram of a SEM image of a positive electrode active material obtained in Example 4.
Figure 7:
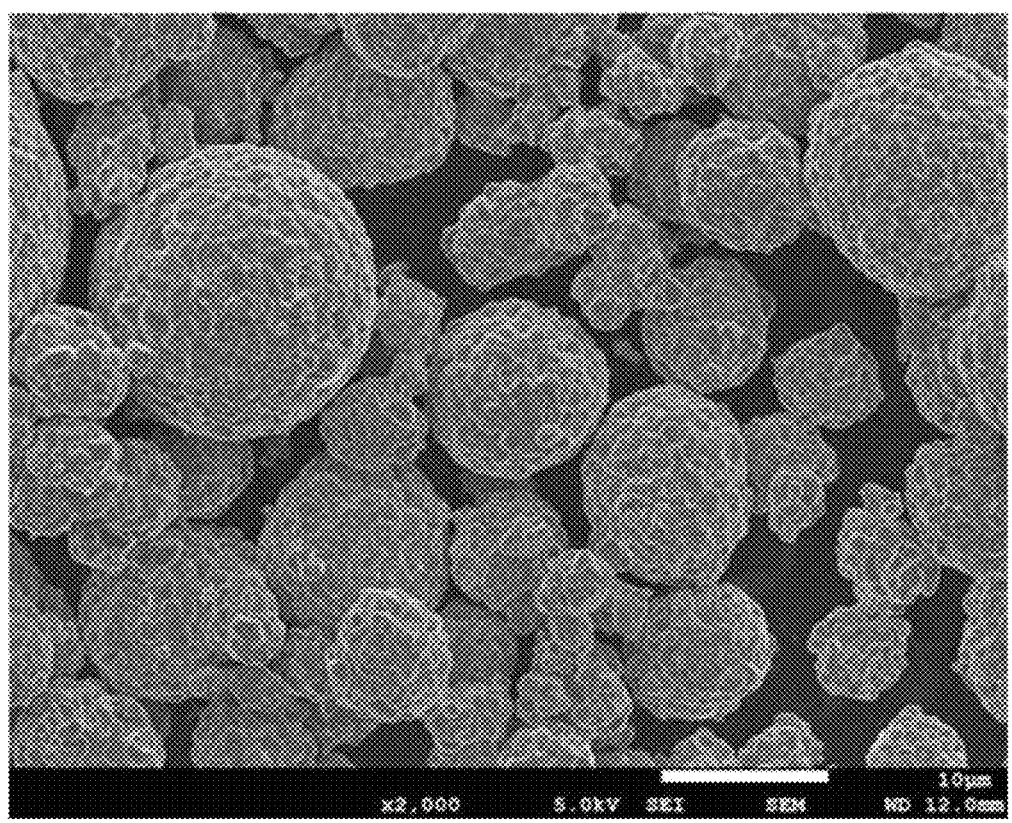
FIG. 7 is a diagram of a SEN. image of a positive electrode active material obtained in Comparative Example 1.
Figure 8:
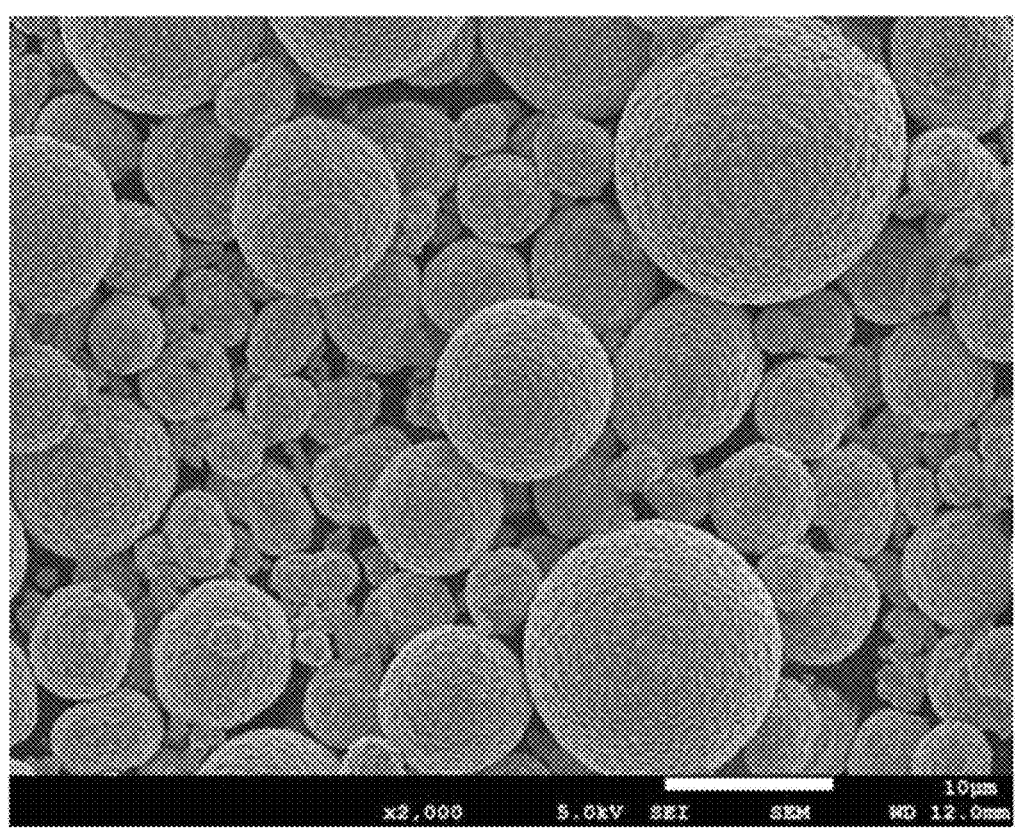
FIG. 8 is a diagram of a SEM image of a positive electrode active material obtained in Comparative Example 2.

As illustrated in FIG. 4, the method of production of the present embodiment may include a process (Step S16) of thermally treating the composite hydroxide particles or the niobium-covered composite hydroxide particles before the mixing process (Step S12 and Step S14). The thermal treatment process (Step S16) is a process of removing at least part of water contained in the composite hydroxide particles by thermal treatment. By removing at least part of water remaining in the composite hydroxide particles, Li/Me of the positive electrode active material obtained at the firing process (Step S20) can be prevented from varying.

The thermal treatment is, in view of further reducing variations in Li/Me, preferably performed so as to sufficiently oxidize the composite hydroxide particles to transform them into composite oxide particles. Water is only required to be removed to the extent, that variations in Li/Me of the positive electrode active material do not occur, and the hydroxide (the composite hydroxide) in all the composite hydroxide particles is not necessarily required to be transformed into the composite oxide. When the thermal treatment process (Step S16) is performed, as illustrated in FIG. 4, the niobium mixing process (Step S10) can prepare the lithium-niobium mixture by thermally treating the composite hydroxide particles before preparing the lithium-niobium mixture and then mixing the composite hydroxide particles and/or the composite oxide particles after the thermal treatment, the lithium compound, and the niobium compound together. When the composite hydroxide particles contain the additional element M, the thermal treatment may be performed after the composite hydroxide particles are covered with a compound containing the additional element M, or the composite hydroxide particles and/or the composite oxide particles after the thermal treatment may be covered with a compound containing the additional element M. When the composite hydroxide particles are covered with the niobium compound described below (refer to FIG. 3), the obtained niobium-covered composite hydroxide particles may be thermally treated.

The thermal treatment may perform heating up to a temperature at which remaining water in the composite hydroxide particles is removed; the temperature of the thermal treatment is preferably at least 105° C. and up to 700° C., for example. When the composite hydroxide particles are heated at 105° C. or higher, at least part of the remaining water can be removed. When the temperature of the thermal treatment is less than 105° C., it takes much time to remove the remaining water, which is industrially inappropriate. When the temperature of the thermal treatment is greater than 800° C., the particles transformed into the composite oxide particles may be sintered and flocculated. When most of the composite hydroxide particles are transformed into the composite oxide particles, for example, the temperature of the thermal treatment is preferably at least 350° C. and up to 700° C.

The composite hydroxide particles obtained at the crystallization process may be thermally treated (roasted) at at least 150° C. and up to 700° C. for at least 1 hour and up to 10 hours to obtain composite oxide particles represented by General Formula (3): $Ni_{1-a-b}Mn_aM_bO_{1+\beta}$ (in Formula (3), M is at least one element selected from Co, W, Mo, V, Mg, Ca, Al, Ti, Cr, Zr, and Ta; and $0.05 \leq a \leq 0.60$, $0 \leq b \leq 0.60$, and $0 \leq \beta \leq 0.4$), for example. After the thermal treatment, the obtained composite oxide particles may be mixed with a niobium compound and a lithium compound to be a lithium-niobium mixture.

As another example of the method for producing a positive electrode active material of the present embodiment, the composite oxide particles represented by General Formula (3) may be used in place of the composite hydroxide particles used at the mixing process. The mixing process may prepare a lithium-niobium mixture containing one or more selected from the nickel-manganese composite hydroxide particles represented by General Formula (2) and the nickel-manganese composite oxide particles represented by General Formula (3); a niobium compound; and a lithium compound. The nickel-manganese composite oxide particles represented by General Formula (3) may be obtained by a method other than the thermal treatment.

The atmosphere for performing the thermal treatment is not limited to a particular atmosphere and is, in view of being able to be easily operated, for example, preferably performed in an air flow. The time for the thermal treatment, which is not limited to a particular time, can be at least 1 hour, for example. When the time for the thermal treatment is less than 1 hour, the remaining water in the composite hydroxide particles cannot necessarily sufficiently be removed. The time for the thermal treatment is preferably at least 5 hours and up to 25 hours The equipment used for the thermal treatment is not limited to particular equipment and may be any one that can heat the composite hydroxide particles in an air flow; preferred examples thereof include blast driers and electric furnaces without gas generation.

(Firing Process)

The firing process (Step S20) is a process of firing the lithium-niobium mixture in an oxidative atmosphere at at least 750° C. and up to 1,000° C. When the lithium-niobium mixture is fired, lithium in the lithium compound diffuses to the composite hydroxide particles or the niobium-covered composite hydroxide particles described below, and a lithium-metal composite oxide formed of particles with a polycrystalline structure is formed. The lithium compound melts at a temperature during the firing, penetrates into the composite hydroxide particles, and forms the lithium-metal composite oxide. In this process, the niobium compound penetrates into the secondary particle together with the melted lithium compound. The niobium compound penetrates into even the primary particles if there are grain boundaries or the like. The penetration facilitates diffusion within the primary particles, whereby niobium is uniformly solid-solved within the primary particles.

The firing temperature is at least 750° C. and up to 1,000° C. and preferably at least 750° C. and up to 950° C. in an oxidative atmosphere. When being fired at the above temperature, melting of the lithium compound occurs, and penetration and diffusion of the niobium compound are facilitated. The lithium-niobium mixture can raise the firing temperature by containing manganese. By raising the firing temperature, diffusion of niobium is facilitated, the crystallinity of the lithium-nickel-manganese composite oxide increases, and output characteristics and energy density can be further improved.

On the other hand, when the firing temperature is less than 750° C., diffusion of lithium and niobium into the nickel-manganese composite hydroxide particles does not sufficiently occur, and excessive lithium or unreacted particles remain, or the crystal structure is not sufficiently adjusted, thus causing a problem in that sufficient battery characteristics cannot be obtained. When the firing temperature is greater than 1,000° C., sintering violently occurs among the formed lithium-transition metal composite oxide particles, and abnormal particle growth may occur. When abnormal particle growth occurs, the particles after the firing are made coarse, and the particle form cannot necessarily be held, and when the positive electrode active material is formed, the specific surface area reduces, causing a problem in that the positive electrode resistance increases, and battery capacity reduces.

The firing time is preferably at least 3 hours and more preferably at least 6 hours and up to 24 hours. When the firing time is less than 3 hours, the lithium-transition metal composite oxide is not necessarily sufficiently formed. The atmosphere during the firing is an oxidative atmosphere and is in particular more preferably an atmosphere with an oxygen concentration of 3 to 100% by volume. That is to say, the firing is preferably performed in an air or oxygen flow. This is because when the oxygen concentration is less than 3% by volume, oxidation cannot sufficiently be performed, and the crystallinity of the lithium-transition metal composite oxide may be insufficient. Considering battery characteristics in particular, performing in an oxygen flow is preferred. A furnace for use in the firing is not limited to a particular furnace and may be any one that can fire the lithium-niobium mixture in an air or oxygen flow; an electric furnace without gas generation is preferably used, and either a batch type or continuous furnace can be used.

The firing process (Step S20) may further include, before performing the firing at a temperature of at least 750° C. and up to 1,000° C., a process of performing preliminary firing at a temperature lower than this firing temperature. The preliminary firing is preferably performed at a temperature at which the lithium compound and/or the niobium compound in the lithium-niobium mixture can melt to react with the composite hydroxide particles. The temperature of the preliminary firing can be at least 350° C. and a temperature lower than the firing temperature, for example. The lower limit of the temperature of the preliminary firing is preferably at least 400° C. The lithium-niobium mixture is held (preliminarily fired) at the above temperature range, whereby the lithium compound and/or the niobium compound penetrate into the composite hydroxide particles, diffusion of lithium and niobium sufficiently occurs, and a uniform lithium-metal composite oxide can be obtained. When lithium hydroxide is used, for example, the preliminary firing is preferably performed held at a temperature of at least 400° C. and up to 550° C. for at least 1 hour and about 10 hours.

In the lithium-transition metal composite oxide obtained by the firing, although sintering among the particles is inhibited, coarse particles may be formed through weak sintering and flocculation. In such a case, the particle size distribution can be adjusted by eliminating the sintering and flocculation by crushing.

3. Nonaqueous Electrolyte Secondary Battery

The nonaqueous electrolyte secondary battery of the present embodiment (hereinafter, also referred to as a "secondary battery") includes the positive electrode active material described above for its positive electrode. The following describes an example of the secondary battery of the present embodiment for each component. The secondary battery of the present embodiment includes a positive electrode, a negative electrode, and a nonaqueous electrolyte solution and is configured by components similar to those of typical lithium-ion secondary batteries. The embodiment described below is only by way of example, and the nonaqueous electrolyte secondary battery can be achieved with forms to which various modifications and improvements have been made based on the knowledge of those skilled in the art including the following embodiment. The secondary battery is not limited to particular uses.

(Positive Electrode)

Using the above positive electrode active material, the positive electrode of the secondary battery is produced. The following describes an exemplary method for producing the positive electrode. First, the positive electrode active material (powdery), a conductive material, and a binding agent (a binder) are mixed together, active carbon and a solvent for viscosity adjustment or the like are further added thereto as needed, and they are kneaded to produce a positive electrode mixture paste.

The mixture ratio of the materials in the positive electrode mixture is a factor for determining the performance of a lithium secondary battery and can thus be adjusted in accordance with uses. The mixture ratio of the materials can be similar to that of a positive electrode of known lithium secondary batteries; when the total mass of the solid content of the positive electrode mixture excluding the solvent is 100% by mass, 60 to 95% by mass of the positive electrode active material, 1 to 20% by mass of the conductive material, and 1 to 20% by mass of the binding agent can be contained, for example.

The obtained positive electrode mixture paste is applied to the surface of a collector made of aluminum foil and is dried to scatter the solvent to produce a sheet-shaped positive electrode, for example. As needed, pressurizing may be performed using a roll press or the like in order to increase electrode density. The thus obtained sheet-shaped positive electrode is cut or the like into appropriate size in accordance with a target battery to be served for production of the battery. The method for producing the positive electrode is not limited to the exemplified one and may be another method.

Examples of the conductive material include graphite (natural graphite, artificial graphite, expanded graphite, and the like) and carbon black materials such as acetylene black and Ketjen black.

Examples of the binding agent (binder), which plays a role of binding active material particles, include polyvinylidene fluoride (PVDF), polytetrafluoroethylene (PTFE), fluoro rubber, ethylene-propylene-diene rubber, styrene butadiene, cellulosic resins, and polyacrylic acid.

A solvent that disperses the positive electrode active material, the conductive material, and the active carbon and dissolves the binding agent is added to the positive electrode mixture as needed. Specific examples of the solvent include organic solvents such as N-methyl-2-pyrrolidone. Active carbon can be added to the positive electrode mixture in order to increase electric double layer capacity.

(Negative Electrode)

Examples of the negative electrode include metal, lithium, lithium alloys. The negative electrode may be formed by applying a negative electrode mixture obtained by mixing a binding agent, with a negative electrode active material that can occlude and desorb lithium ions and adding an appropriate solvent to be paste form to the surface of a metal foil collector such as copper, drying, and compressing it in order to increase electrode density as needed.

Examples of the negative electrode active material, include natural graphite, artificial graphite, organic compound fired bodies such as phenol resin, and powder of carbon substances such as coke. In this case, examples of a negative electrode binding agent include fluorine-containing resins such as PVDF similarly to the positive electrode. Examples of a solvent in which the active material and the binding agent are dispersed include organic solvents such as N-methyl-2-pyrrolidone.

(Separator)

A separator is interposed between the positive electrode and the negative electrode. The separator separates the positive electrode and the negative electrode from each other and holds an electrolyte, and known separators can be used; examples thereof include thin films formed of polyethylene, polypropylene, or the like, the films having many minute holes.

(Nonaqueous Electrolyte Solution)

A nonaqueous electrolyte solution is a solution obtained by dissolving a lithium salt as a supporting salt in an organic solvent. Examples of the organic solvent include cyclic carbonates such as ethylene carbonate, propylene carbonate, butylene carbonate, and trifluoro propylene carbonate; chain carbonates such as diethyl carbonate, dimethyl carbonate, ethylmethyl carbonate, and dipropyl carbonate; ether compounds such as tetrahydrofuran, 2-methyltetrahydrofuran, and dimethoxy ethane; sulfur compounds such as ethylmethyl sulfone and butane sulfone; and phosphorous compounds such as triethyl phosphate and trioctyl phosphate; for the solvent, one or two or more in combination selected from the above can be used.

Examples of the supporting salt include $LiPF_6$, $LiBF_4$, $LiClO_4$, $LiAsF_6$, $LiN(CF_3SO_2)_2$ and their composite salts. Furthermore, the nonaqueous electrolyte solution may contain radical scavengers, surfactants, fire retardants, and the like.

(Shape and Configuration of Secondary Battery)

The nonaqueous electrolyte secondary battery according to the present invention including the positive electrode, the negative electrode, the separator, and the nonaqueous electrolyte solution described above can be formed into various shapes such as cylindrical and stacked shapes. For any shape employed, the positive electrode and the negative electrode are stacked via the separator to form an electrode body, the obtained electrode body is impregnated with the nonaqueous electrolyte solution, a positive electrode collector and a positive electrode terminal communicating with the outside and a negative electrode collector and a negative electrode terminal communicating with the outside are each connected using a collector lead, and the electrode body is hermetically sealed in a battery case to complete the nonaqueous electrolyte secondary battery.

(Characteristics of Secondary Battery)

The secondary battery of the present embodiment can achieve both high output, characteristics and high energy density and short-circuit safety owing to a reduction in conductivity. The positive electrode active material for use in the secondary battery of the present embodiment can be obtained by the industrial method of production described above. The secondary battery of the present embodiment is suitable for power supplies of small-sized portable electronic devices (such as notebook personal computers and cellular phone terminals), which always require high capacity. The nonaqueous electrolyte secondary battery of the present embodiment is excellent in safety and is additionally excellent in output characteristics and capacity compared with conventional batteries containing a positive electrode active material of a lithium-cobalt-based oxide or a lithium-nickel-based oxide. Consequently, it can be reduced in size and increased in output and is suitable as power supplies for electric vehicles subjected to limitation in mounting space. The secondary batter of the present embodiment can be used as not only power supplies for electric vehicles purely driven by electrical energy but also power supplies for what is called hybrid cars, which use combustion engines such as gasoline engines and diesel engines in combination.

EXAMPLES

Figure 12:
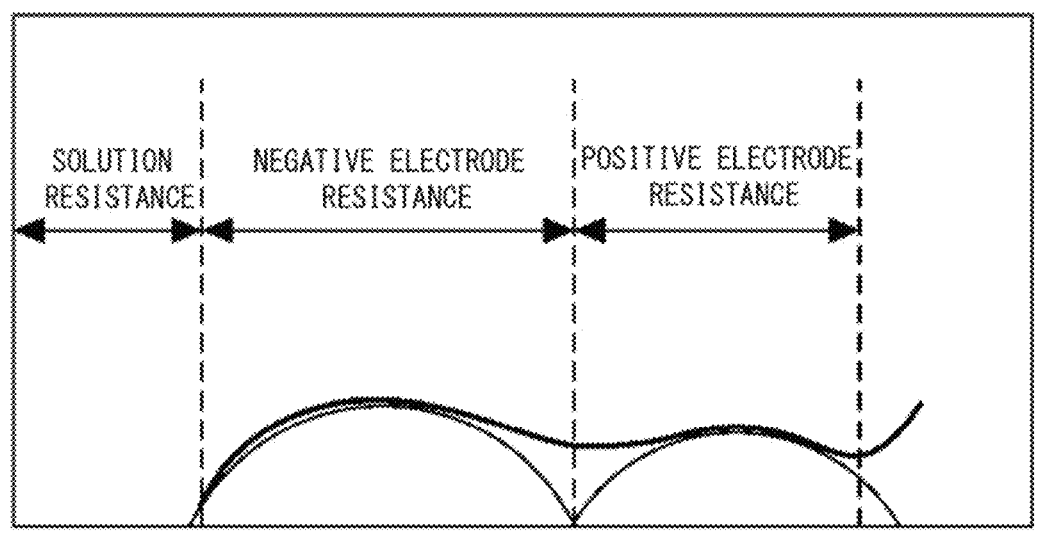
FIG. 12 is a diagram of an exemplary Nyquist plot.
Figure 13:
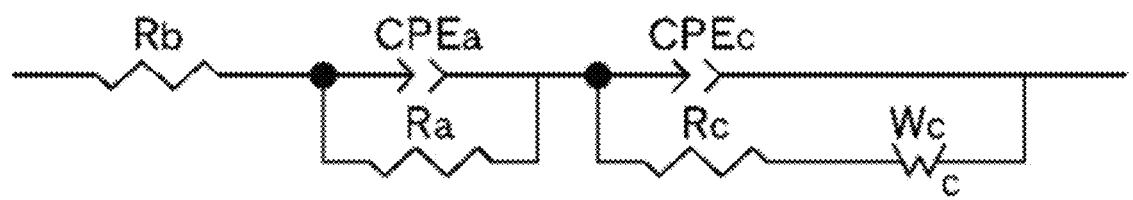
FIG. 13 is a diagram of an equivalent circuit used for impedance evaluation.

The following describes the present invention in more detail with reference to examples and comparative examples of the present invention; the present invention is not limited by these examples at all. Methods for analyzing metals contained in positive electrode active materials and various kinds of methods for evaluating the positive electrode active materials in the examples and the comparative examples are as follows:
(1) Composition Analysis: It was measured by TCP emission spectroscopy.
(2) Average Particle Diameter MV and [(D90−D10)/Average Volume Particle Diameter]: Measurement was performed with a laser diffraction/scattering particle size distribution measurement apparatus (Microtrac HRA manufactured by Nikkiso Co., Ltd.).
(3) Crystal Structure: An XRD diffraction apparatus (X'Pert PRO manufactured by Panalytical)
(4) Form Observation and Evaluation of Average Degree of Circularity: A SEM (JSM-6360LA manufactured by JEOL Ltd). For the average degree of circularity, particle projected areas and particle circumferential lengths were determined for particles with a particle diameter of at least 1 μm observed with SEM with a magnification of 1,000-fold using image analysis software (e.g., ImageJ), and they were averaged to calculate the average degree of circularity. At least 40 particles were analyzed.
(5) Conductivity Measurement: A positive electrode active material was weighed within a range of at least 4.5 g and up to 5.5 g was pressurized and molded into a cylindrical shape with a diameter of 20 mm with a load of 20 kN using a powder resistance measurement unit (MCP-PD51 manufactured by Mitsubishi Chemical Corporation). Then, the volume resistivity of the mold was measured by the resistivity test method by the four-probe method in compliance with JIS K 7194: 1594 using a resistivity meter (MCP-T610manufactured by Mitsubishi Chemical Corporation) while maintained at. the state pressurized with a load of 20 kN and was converted into conductivity.
(6) Niobium Concentration; The positive electrode active material was processed so as to enable sectional analysis of the primary particles with an S-TEM. From a plurality of secondary particles contained in the positive electrode active material, 30 primary particles were arbitrarily selected, and line analysis was performed on the composition within sections of individual primary particles by EDX of S-TEM. In this process, for the direction of the line analysis, a direction in which a measured value of a niobium concentration near the surface of the primary particle is not influenced by the presence of a niobium compound on the surfaces of the primary particles by performing surface analysis in advance and in which analysis for a length of at least 50% of the maximum length of the primary particles was enabled was selected. From measured values of the niobium concentration obtained by the line analysis, a maximum niobium concentration and an average niobium concentration within the primary particles were determined, the ratios of the maximum niobium concentration of the individual primary particles were each calculated, and the ratios of the maximum niobium concentration calculated from the respective primary particles were number-averaged to determine the ratio of the maximum niobium concentration of the positive electrode active material.
(7) Initial Charging Capacity and Initial Discharging Capacity; For initial charging capacity and initial discharging capacity, a coin-type battery illustrated in FIG. 11 was produced and was allowed to stand for about 24hours and was charged to a cutoff voltage 4.3 V with a current density to the positive electrode of 0.1 mA/cm$^2$ after an open circuit voltage (OCV) stabilized, and a capacity at that time was determined to be the initial charging capacity; a capacity when it was discharged to a cutoff voltage 3.0 V after a one-hour suspension was determined to be the initial discharging capacity. For the measurement of the discharging capacity, a multi-channel voltage/current generator (R6741A manufactured by Advantest Corporation) was used.
(8) Reaction Resistance: For reaction resistance, the coin-type battery was adjusted to have a measurement temperature and charged at a charge potential of 4.1 V, and then a resistance value was measured by an AC impedance method. For the measurement, using a frequency response analyzer and a potentiogalvanostat (1255B manufactured by Solartron), a Nyquist plot illustrated in FIG. 12 was created, and fitting calculation was performed using an equivalent circuit illustrated in FIG. 13 to calculate a value of positive electrode resistance (the reaction resistance).
(9) Volume Energy Density: An average discharge voltage was calculated from the result of charging/discharging measurement, and from this value, a tap density, and the initial discharging capacity, volume energy density was calculated from the expression Volume energy density (Wh/L)=average discharge voltage (V)×discharging capacity (A/kg)×tap density (kg/L). The tap density was measured using a tapping apparatus (KYT 3000 manufactured by Seishin Enterprise Co., Ltd.) and was calculated from a volume and a sample weight after 500 times of tapping.

Example 1

(Crystallization Process)
A certain amount of pure water was put into a reaction tank (60 L), and the intra-tank temperature was set to 45° C. while stirring it. In this process, an N$_2$ gas was passed through the reaction tank so as to give a dissolved oxygen concentration in the liquid in the reaction tank of 0.3 mg/L. A 2.0 M mixed aqueous solution of nickel sulfate, cobalt sulfate, and manganese sulfate, a 25% by mass sodium hydroxide solution as an alkaline solution, and a 25% by mass ammonia water as a complexing agent were added to this reaction tank simultaneously and continuously so as to give a molar ratio among nickel:cobalt:manganese of 60:20:20.In this process, the flow was controlled so as to give a residence time of the mixed aqueous solution of 8 hours, the pH within the reaction tank was adjusted to be 11.8 to 12.1, and the ammonia concentration was adjusted to be 12 to 13 g/L. After the reaction tank stabilized, slurry containing a nickel-cobalt-manganese composite hydroxide was collected from an overflow port and was filtered to obtain a cake of the nickel-cobalt-manganese composite hydroxide (the crystallization process). Pure water in an amount of 1 L was passed through 140 g of the nickel-cobalt-manganese composite hydroxide within a Denver after filtration to wash away impurities. The powder after filtration was dried to obtain nickel-cobalt-manganese composite hydroxide particles represented by Ni$_{0.60}$Co$_{0.20}$Mn$_{0.20}$(OH)$_{2+\alpha}$ ($0 \leq \alpha \leq 0.4$).

(Lithium Mixing Process)

The obtained nickel-cobalt-manganese composite hydroxide particles, lithium carbonate, and niobic acid ($Nb_2O_5 \cdot nH_2O$) with an average particle diameter of 1.0 μm were weighed so as to give a molar ratio among nickel:cobalt:manganese:niobium of 59.9:20.0:20.0:0.1 and an atomic ratio between a lithium amount (Li) and the total metal amount (Me) of nickel, cobalt, manganese, and niobium (hereinafter, referred to as Li/Me) of 1.03 and were sufficiently mixed together using a shaker mixer (TURBULA Type T2C manufactured by Willy A. Bachofen (WAB)) to obtain a lithium mixture.

(Firing Process)

The obtained lithium mixture was fired by holding it in an air (oxygen: 21% by volume) flow at 900° C. for 10 hours and was then crushed to obtain a positive electrode active material containing a lithium-nickel-cobalt-manganese-niobium composite oxide.

Table 1 lists the volume average particle diameter MV, the average degree of circularity, and the conductivity of the obtained positive electrode active material. From the result of XRD measurement, there was no heterogeneous phase, and an increase in the lattice constants a and c of the lithium-nickel-cobalt-manganese composite oxide was recognized. From the result of STEM-EDX analysis, there was no segregation, and it was determined that niobium was solid-solved in the crystal structure.

[Production of Battery]

Figure 11:
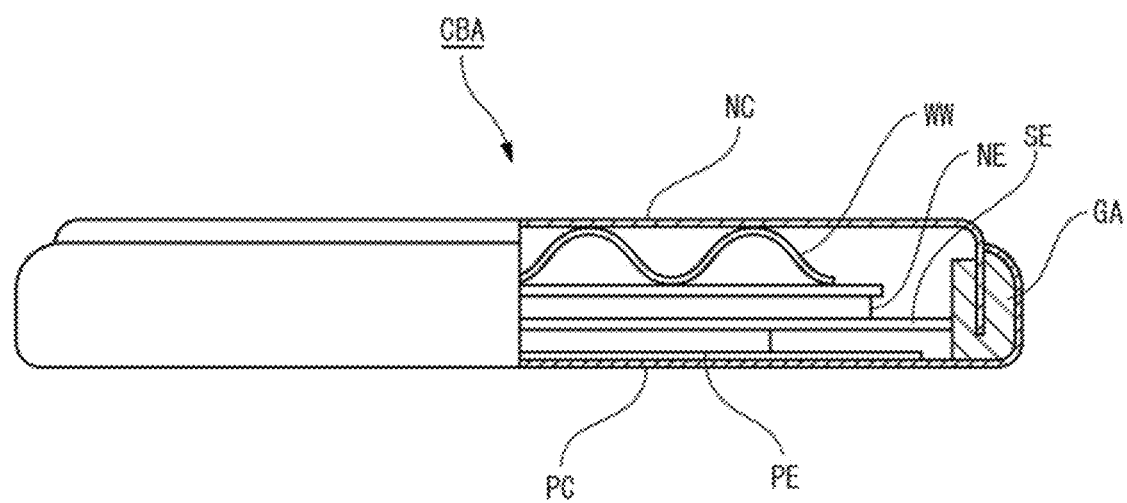
FIG. 11 is a schematic sectional view of a coin-type battery used for battery evaluation.

Mixed together were 52.5 mg of the obtained positive electrode active material, 15 mg of acetylene black, and 7.5 mg of a polytetrafluoroethylene resin (FTFE), the resultant mixture was press-formed at a pressure of 100 MPa to a diameter of 11 mm and a thickness of 100 μm to form a positive electrode (an electrode for evaluation) PE illustrated in FIG. 11. The produced positive electrode PE was dried in a vacuum drier at 120° C. for 12 hours, and then using this positive electrode PE, a 2032 type coin battery CBA was produced in a glove box in an Ar atmosphere and the dew point of which was controlled to −80° C. For a negative electrode NE, lithium (Li) metal with a diameter of 17 mm and a thickness of 1 mm was used. For an electrolyte solution, a liquid mixture of an equivalent amount of ethylene carbonate (EC) and diethyl carbonate (DEC) with 1 M $LiClO_4$ as a supporting electrolyte (manufactured by Tomiyama Pure Chemical Industries, Ltd.) was used. For a separator SE, a polyethylene porous film with a film thickness of 25 μm was used. The coin battery has a gasket GA and a wave washer WW, and the coin-type battery was assembled with a positive electrode can PC and a negative electrode can NC. Table 2 lists measurement results of the initial charging and discharging capacities and the positive electrode resistance value of the obtained positive electrode active material.

Example 2

A positive electrode active material was obtained and evaluated similarly to Example 1 except that the nickel-cobalt-manganese composite hydroxide particles obtained in Example 1, lithium carbonate, and niobic acid ($Nb_2O_5 \cdot nH_2O$) with an average particle diameter of 1.0 μm were weighed so as to give a molar ratio among nickel:cobalt:manganese:niobium of 59.9:19.8:19.8:0.50. Table 1 and Table 2 list evaluation results. FIG. 1 shows a SEM image of the obtained positive electrode active material.

Example 3

(Crystallization Process)

Similarly to the crystallization process of Example 1, nickel-cobalt-manganese composite hydroxide particles represented by $Ni_{0.60}Co_{0.20}Mn_{0.20}(OH)_{2+\alpha}$ ($0 \leq \alpha \leq 0.4$) were obtained.

(Niobium Covering Process)

Next, a niobic acid ($Nb_2O_5 \cdot nH_2O$) powder was dissolved in a potassium hydroxide solution with a concentration of 300 g/L so as to give a niobium concentration of 30 g/L by maintaining a dissolution temperature constant at 80° C. with stirring for 2 hours, and then the residue was filtered out to produce a niobium salt solution. To slurry obtained by mixing the nickel-cobalt-manganese composite hydroxide and pure water together, the niobium salt solution and a 25% by mass aqueous sulfuric acid solution were simultaneously added dropwise so as to give a pH of 8.0 while being held at a liquid temperature of 25° C. to obtain a nickel-cobalt composite hydroxide covered with a niobium compound. A target niobium addition amount was set to 0.50 (molar ratio).

(Lithium Mixing Process and Firing Process)

The obtained niobium-covered nickel-cobalt-manganese composite hydroxide particles and lithium carbonate were weighed so as to give an atomic ratio between lithium and the total metal amount of nickel, cobalt, manganese, and niobium (hereinafter, referred to as Li/Me) of 1.03 and were sufficiently mixed together using a shaker mixer (TURBULA Type T2C manufactured by Willy A. Bachofen (WAB)) to obtain a lithium mixture. The firing process and the subsequent were performed similarly to those of Example 1 to obtain and evaluate a positive electrode active material. Table 1 and Table 2 list evaluation results.

Example 4

A positive electrode active material was obtained and evaluated similarly to Example 1 except that the nickel-cobalt-manganese composite hydroxide particles obtained in Example 1, lithium carbonate, and niobic acid ($Nb_2O_5 \cdot nH_2O$) with an average particle diameter of 1.0 μm were weighed so as to give a molar ratio among nickel:cobalt:manganese:niobium of 59.6:19.7:19.7:1.0. Table 1 and Table 2 list evaluation results. FIG. 2 shows a SEM image of the obtained positive electrode active material.

Example 5

A positive electrode active material was obtained and evaluated similarly to Example 4 except that the nickel-cobalt-manganese composite hydroxide particles obtained in Example 1 was roasted (thermally treated) in an air flow at 500° C. for 5 hours to obtain nickel-cobalt-manganese composite oxide particles represented by $Ni_{0.60}Co_{0.20}Mn_{0.20}O_{1+\beta}$ ($0 \leq \beta \leq 0.4$). Table 1 and Table 2 list evaluation results.

Example 6

A positive electrode active material was obtained and evaluated similarly to Example 1 except that the nickel-cobalt-manganese composite hydroxide particles obtained in Example 1, lithium carbonate, and niobic acid ($Nb_2O_5 \cdot nH_2O$) with an average particle diameter of 1.0 μm were weighed so as to give a molar ratio among nickel:cobalt:manganese:niobium of 59.1:19.2:19.2:2.5. Table 1 and Table 2 list evaluation results.

Example 7

A positive electrode active material was obtained and evaluated similarly to Example 3 except that nickel-cobaltmanganese composite hydroxide particles represented by $Ni_{0.60}Co_{0.20}Mn_{0.20}(OH)_{2+\alpha}$ ($0 \leq \alpha \leq 0.4$) were obtained similarly to the crystallization process of Example 1, and then a target niobium addition amount was set to 2.5 (molar ratio). Table 1 and Table 2 list evaluation results.

Example 8

(Crystallization Process)

A certain amount of pure water was put into a reaction tank (80 L), and the intra-tank temperature was set to 45° C. while stirring it. In this process, an gas was passed through the reaction tank so as to give a dissolved oxygen concentration in the liquid in the reaction tank of 1.5 mg/L. A 2.0 M mixed aqueous solution of nickel sulfate, cobalt sulfate, and manganese sulfate, a 25% by mass sodium hydroxide solution as an alkaline solution, and a 25% by mass ammonia water as a complexing agent were added to this reaction tank simultaneously and continuously so as to give a molar ratio among nickel:cobalt:manganese of 80:10:10. In this process, the flow was controlled so as to give a residence time of the mixed aqueous solution of 8 hours, the pH within the reaction tank was adjusted to be 11.8 to 12.1, and the ammonia concentration was adjusted to be 12 to 13 g/L. After the reaction tank stabilized, slurry containing a nickel-cobalt-manganese composite hydroxide was collected from an overflow port and was filtered to obtain a cake of the nickel-cobalt-manganese composite hydroxide (the crystallization process). Pure water in an amount of 1 L was passed through 140 g of the nickel-cobalt-manganese composite hydroxide within a Denver after filtration to wash away impurities. The powder after filtration was dried to obtain nickel-cobalt-manganese composite hydroxide particles represented by $Ni_{0.80}Co_{0.10}Mn_{0.10}(OH)_{2+\alpha}$ ($0 \leq \alpha \leq 0.4$).

(Lithium Mixing Process)

The obtained nickel-cobalt-manganese composite hydroxide particles, lithium hydroxide, and niobic acid ($Nb_2O_5 \cdot nH_2O$) with an average particle diameter of 1.0 μm were weighed so as to give a molar ratio among nickel:cobalt:manganese:niobium of 79.7:10.0:9.8:0.50 and an atomic ratio between a lithium amount (Li) and the total metal amount (Me) of nickel, cobalt, manganese, and niobium (hereinafter, referred to as Li/Me) of 1.02 and were sufficiently mixed together using a shaker mixer (TURBULA Type T2C manufactured by Willy A. Bachofen (WAB)) to obtain a lithium mixture.

(Firing Process)

The obtained lithium mixture was fired by holding it in an oxygen flow at 870° C. for 10 hours and was then crushed to obtain a positive electrode active material containing a lithium-nickel-cobalt-manganese-niobium composite oxide. Table 1 and Table 2 list evaluation results.

Example 9

(Crystallization Process)

Similarly to the crystallization process of Example 3, nickel-cobalt-manganese composite hydroxide particles represented by $Ni_{0.80}Co_{0.10}Mn_{0.10}(OH)_{2+\alpha}$ ($0 \leq \alpha \leq 0.4$) were obtained.

(Niobium Covering Process)

Next, a niobic acid ($Nb_2O_5 \cdot nH_2O$) powder was dissolved in a potassium hydroxide solution with a concentration of 300 g/L so as to give a niobium concentration of 30 g/L by maintaining a dissolution temperature constant at 80° C. with stirring for 2 hours, and then the residue was filtered out to produce a niobium salt solution. To slurry obtained by mixing the nickel-cobalt-manganese composite hydroxide and pure water together, the niobium salt solution and a 25% by mass aqueous sulfuric acid solution were simultaneously added dropwise so as to give a pH of 8.0 while being held at a liquid temperature of 25° C. to obtain a nickel-cobalt composite hydroxide covered with a niobium compound. A target niobium addition amount was set to 0.50 (molar ratio).

(Lithium Mixing Process and Firing Process)

The obtained niobium-covered nickel-cobalt-manganese composite hydroxide particles and lithium hydroxide were weighed so as to give an atomic ratio between lithium and the total metal amount of nickel, cobalt, manganese, and niobium (hereinafter, referred to as Li/Me) of 1.02 and were sufficiently mixed together using a shaker mixer (TURBULA Type T2C manufactured by Willy A. Bachofen (WAB)) to obtain a lithium mixture. The firing process and the subsequent were performed similarly to those of Example 8 to obtain and evaluate a positive electrode active material Table 1 and Table 2 list evaluation results.

Example 10

A positive electrode active material was obtained and evaluated similarly to Example 8 except that the nickel-cobalt-manganese composite hydroxide particles obtained in Example 8, lithium carbonate, and niobic acid ($Nb_2O_5 \cdot nH_2O$) with an average particle diameter of 1.0 μm were weighed so as to give a molar ratio among nickel:cobalt:manganese:niobium of 79.3:10.0:9.7:1.0. Table 1 and Table 2 list evaluation results.

Example 11

A positive electrode active material was obtained and evaluated similarly to Example 8 except that the nickel-cobalt-manganese composite hydroxide particles obtained in Example 8, lithium hydroxide, and niobic acid ($Nb_2O_5 \cdot nH_2O$) with an average particle diameter of 1.0 μm were weighed so as to give a molar ratio among nickel:cobalt:manganese:niobium of 78.3:9.8:9.4:2.5. Table 1 and Table 2 list evaluation results.

Example 12

(Crystallization Process)

A certain amount of pure water was put into a reaction tank (60 L), and the intra-tank temperature was set to 42° C. while stirring it. In this process, an $N_2$ gas was passed through the reaction tank so as to give a dissolved oxygen concentration in the liquid in the reaction tank of 0.6 mg/L. A 2.0 M mixed aqueous solution of nickel sulfate, cobalt sulfate, and manganese sulfate, a 25% by mass sodium hydroxide solution as an alkaline solution, and a 25% by mass ammonia water as a complexing agent were added to this reaction tank simultaneously and continuously so as to give a molar ratio among nickel:cobalt:manganese of 35:30:35. In this process, the flow was controlled so as to give a residence time of the mixed aqueous solution of 8 hours, the pH within the reaction tank was adjusted to be 11.8 to 12.1, and the ammonia concentration was adjusted to be 12 to 13 g/L. After the reaction tank stabilized, slurry containing a nickel-cobalt-manganese composite hydroxide was collected from an overflow port and was filtered to obtain a cake of the nickel-cobalt-manganese composite hydroxide (the crystallization process). Pure water in an amount of 1 L was passed through 140 g of the nickel-cobalt-manganese composite hydroxide within a Denver after filtration to wash away impurities. The powder after filtration was dried to obtain nickel-cobalt-manganese composite hydroxide particles represented by $Ni_{0.35}Co_{0.30}Mn_{0.35}(OH)_{2+\alpha}$ ($0 \le \alpha \le 0.4$).

(Lithium Mixing Process)

The obtained nickel-cobalt-manganese composite hydroxide particles, lithium carbonate, and niobic acid ($Nb_2O_5 \cdot nH_2O$) with an average particle diameter of 1.0 μm were weighed so as to give a molar ratio among nickel:cobalt:manganese:niobium of 34.4:34.7:29.9:1.0 and an atomic ratio between a lithium amount (Li) and the total metal amount (Me) of nickel, cobalt, manganese, and niobium (hereinafter, referred to as Li/Me) of 1.07 and were sufficiently mixed together using a shaker mixer (TURBULA Type T2C manufactured by Willy A. Bachofen (WAB)) to obtain a lithium mixture.

(Firing Process)

The obtained lithium mixture was fired by holding it in an air (oxygen: 21% by volume) flow at 940° .C for 10 hours and was then crushed to obtain a positive electrode active material containing a lithium-nickel-cobalt-manganese-niobium composite oxide. Table 1 and Table 2 list evaluation results.

(Comparative Example 1)

A positive electrode active material was obtained and evaluated similarly to Example 1 except that the obtained nickel-cobalt-manganese composite hydroxide particles and lithium carbonate were weighed so as to give a molar ratio among nickel:cobalt:manganese of 60.0:20.0:20.0. Table 1 and Table 2 list evaluation results. FIG. 3 shows a SEM image of the obtained positive electrode active material.

(Comparative Example 2)

A positive electrode active material was obtained and evaluated similarly to Example 1 except that the obtained nickel-cobalt-manganese composite hydroxide particles, lithium carbonate, and niobic acid ($Nb_2O_5 \cdot nH_2O$) with an average particle diameter of 1.0 μm were weighed so as to give a molar ratio among nickel:cobalt:manganese:niobium of 58.8:19.0:19.0:3.2. Table 1 and Table 2 list evaluation results. FIG. 4 shews a SEM image of the obtained positive electrode active material.

(Comparative Example 3)

A positive electrode active material was obtained and evaluated similarly to Example 1 except that the obtained nickel-cobalt-manganese composite hydroxide particles, lithium carbonate, and niobic acid ($Nb_2O_5 \cdot nH_2O$) with an average particle diameter of 1.0 μm were weighed so as to give a molar ratio among nickel:cobalt:manganese:niobium of 59.98:20.0:20.0:0.02. Table 1 and Table 2 list evaluation results.

(Comparative Example 4)

A positive electrode active material was obtained and evaluated similarly to Example 4 except that the lithium mixture was held and fired in an air (oxygen: 21% by volume) flow at 1,020° C. for 10 hours. Table 1 and Table 2 list evaluation results.

(Comparative Example 5)

A positive electrode active material was obtained and evaluated similarly to Example 4 except that the lithium mixture was held and fired in an air (oxygen: 21% by volume) flow at 680° C. for 10 hours. Table 1 and Table 2 list evaluation results.

(Comparative Example 6)

A positive electrode active material was obtained and evaluated similarly to Example 1 except that nickel-cobalt composite hydroxide particles represented by $Ni_{0.60}Co_{o0.40}(OH)_{2+\alpha}$ ($0 \le \alpha \le 0.4$) were obtained similarly to the crystallization process of Example 1, and then a target niobium addition amount was set to 0.50 (molar ratio). Table 1 and Table 2 list evaluation results.

(Comparative Example 7)

A positive electrode active material was obtained and evaluated similarly to Example 8 except that the obtained nickel-cobalt-manganese composite hydroxide particles and lithium carbonate were weighed so as to give a molar ratio among nickel:cobalt:manganese of 80.0:10.0:10.0. Table 1 and Table 2 list evaluation results.

(Comparative Example 8)

A positive electrode active material was obtained and evaluated similarly to Example 12 except that the obtained nickel-cobalt-manganese composite hydroxide particles and lithium carbonate were weighed so as to give a molar ratio among nickel:cobalt:manganese of 35.0:30.0:35.0. Table 1 and Table 2 list evaluation results.

TABLE 1

| | Production condition | | | Positive electrode active material General Formula (1) | | | | |
|---|---|---|---|---|---|---|---|---|
| | Nb addition amount (at %) | Method for adding Nb | Firing temperature (° C.) | Li d | Ni 1-a-b-c | Mn a | Co b | Nb c |
| Example 1 | 0.1 | Solid phase addition | 900 | 1.03 | 0.599 | 0.200 | 0.200 | 0.001 |
| Example 2 | 0.5 | Solid phase addition | 900 | 1.03 | 0.599 | 0.198 | 0.198 | 0.005 |
| Example 3 | 0.5 | Coating | 900 | 1.03 | 0.599 | 0.198 | 0.198 | 0.005 |
| Example 4 | 1.0 | Solid phase addition | 900 | 1.03 | 0.596 | 0.197 | 0.197 | 0.01 |
| Example 5 | 1.0 | Solid phase addition | 900 | 1.03 | 0.596 | 0.197 | 0.197 | 0.01 |
| Example 6 | 2.5 | Solid phase addition | 900 | 1.03 | 0.591 | 0.192 | 0.192 | 0.025 |

TABLE 1-continued

| | | | | | | | | |
|---|---|---|---|---|---|---|---|---|
| Example 7 | 2.5 | Coating | 900 | 1.03 | 0.591 | 0.192 | 0.192 | 0.025 |
| Example 8 | 0.5 | Solid phase addition | 870 | 1.02 | 0.797 | 0.098 | 0.10 | 0.005 |
| Example 9 | 0.5 | Coating | 870 | 1.02 | 0.757 | 0.098 | 0.10 | 0.005 |
| Example 10 | 1.0 | Solid phase addition | 870 | 1.02 | 0.793 | 0.097 | 0.10 | 0.01 |
| Example 11 | 2.5 | Solid phase addition | 870 | 1.02 | 0.783 | 0.094 | 0.098 | 0.025 |
| Example 12 | 1.0 | Solid phase addition | 940 | 1.07 | 0.344 | 0.299 | 0.347 | 0.01 |
| Comparative Example 1 | 0.0 | — | 900 | 1.03 | 0.60 | 0.20 | 0.20 | 0 |
| Comparative Example 2 | 3.2 | Solid phase addition | 900 | 1.03 | 0.588 | 0.190 | 0.190 | 0.032 |
| Comparative Example 3 | 0.02 | Solid phase addition | 900 | 1.03 | 0.5998 | 0.200 | 0.200 | 0.0002 |
| Comparative Example 4 | 1.0 | Solid phase addition | 1020 | 1.03 | 0.596 | 0.197 | 0.197 | 0.01 |
| Comparative Example 5 | 1.0 | Solid phase addition | 680 | 1.03 | 0.596 | 0.197 | 0.197 | 0.01 |
| Comparative Example 6 | 0.5 | Solid phase addition | 820 | 1.03 | 0.597 | 0 | 0.398 | 0.005 |
| Comparative Example 7 | 0.0 | — | 870 | 1.02 | 0.8 | 0.10 | 0.10 | 0 |
| Comparative Example 8 | 0.0 | — | 940 | 1.07 | 0.35 | 0.35 | 0.30 | 0 |

| | Positive electrode active material | | | | | |
|---|---|---|---|---|---|---|
| | Average particle diameter MV (μm) | Average degree of circularity | Conductivity (S/cm) | Solid-solving of niobium | Compound on surfaces of primary particles | Nb concentration ratio (maximum/ average) |
| Example 1 | 12.7 | 0.68 | $6.78 \times 10^{-3}$ | Present | Absent | 1.3 |
| Example 2 | 12.6 | 0.75 | $1.98 \times 10^{-3}$ | Present | Absent | 1.7 |
| Example 3 | 12.5 | 0.76 | $1.85 \times 10^{-3}$ | Present | Absent | 1.6 |
| Example 4 | 12.0 | 0.79 | $1.79 \times 10^{-3}$ | Present | $Li_3NbO_4$ | 1.7 |
| Example 5 | 12.1 | 0.80 | $1.83 \times 10^{-3}$ | Present | $Li_3NbO_4$ | 1.7 |
| Example 6 | 11.3 | 0.80 | $2.80 \times 10^{-3}$ | Present | $Li_3NbO_4$ | 1.9 |
| Example 7 | 11.1 | 0.81 | $2.62 \times 10^{-3}$ | Present | $Li_3NbO_4$ | 1.8 |
| Example 8 | 12.5 | 0.68 | $3.69 \times 10^{-4}$ | Present | Absent | 1.4 |
| Example 9 | 12.5 | 0.69 | $5.62 \times 10^{-4}$ | Present | Absent | 1.6 |
| Example 10 | 11.9 | 0.78 | $4.70 \times 10^{-3}$ | Present | Absent | 1.5 |
| Example 11 | 11.0 | 0.80 | $4.92 \times 10^{-3}$ | Present | $LiNbO_3$ | 1.9 |
| Example 12 | 12.4 | 0.82 | $8.24 \times 10^{-5}$ | Present | Absent | 1.6 |
| Comparative Example 1 | 12.7 | 0.65 | $1.35 \times 10^{-2}$ | Absent | — | — |
| Comparative Example 2 | 9.9 | 0.82 | $2.77 \times 10^{-3}$ | Present | $Li_3NbO_4$ | 3.2 |
| Comparative Example 3 | 12.8 | 0.62 | $1..02 \times 10^{-2}$ | Present | Absent | 1.9 |
| Comparative Example 4 | 15.3 | 0.53 | $1.13 \times 10^{-2}$ | Present | $Li_2NbO_4$ | 4.6 |
| Comparative Example 5 | 13.0 | 0.61 | $4.30 \times 10^{-4}$ | Absent | $Nb_2O_5$ | — |
| Comparative Example 6 | 12.5 | 0.58 | $1.75 \times 10^{-2}$ | Present | Absent | 1.8 |
| Comparative Example 7 | 14.3 | 0.58 | $1.67 \times 10^{-2}$ | Absent | — | — |
| Comparative Example 8 | 11.9 | 0.70 | $3.69 \times 10^{-4}$ | Present | Absent | — |

TABLE 2

| | Battery characteristics | | | |
|---|---|---|---|---|
| | Initial charging capacity (mAh/g) | Intial discharging capacity (mAh/g) | Volume energy density (Wh/L) | Positive electrode resistance (Ω) |
| Example 1 | 191.5 | 174.4 | 1449 | 1.87 |
| Example 2 | 192.7 | 174.9 | 1473 | 1.63 |
| Example 3 | 193.0 | 175.2 | 1469 | 1.60 |
| Example 4 | 193.4 | 174.1 | 1512 | 1.55 |
| Example 5 | 193.1 | 173.8 | 1510 | 1.58 |
| Example 6 | 192.0 | 174.2 | 1560 | 1.94 |
| Example 7 | 192.3 | 174.7 | 1538 | 1.86 |
| Example 8 | 216.8 | 193.0 | 1669 | 1.96 |
| Example 9 | 215.9 | 193.4 | 1695 | 1.89 |
| Example 10 | 222.4 | 181.5 | 1590 | 1.73 |
| Example 11 | 208.7 | 175.2 | 1622 | 2.74 |
| Example 12 | 176.7 | 161.5 | 1421 | 1.87 |
| Comparative Example 1 | 191.4 | 174.0 | 1419 | 2.15 |
| Comparative Example 2 | 186.8 | 158.6 | 1462 | 2.20 |
| Comparative Example 3 | 188.3 | 167.6 | 1341 | 2.26 |
| Comparative Example 4 | 158.6 | 140.3 | 1042 | 3.07 |
| Comparative Example 5 | 146.0 | 131.1 | 939 | 10.5 |
| Comparative Example 6 | 190.2 | 170.0 | 1231 | 2.05 |
| Comparative Example 7 | 215.4 | 193.5 | 1489 | 3.33 |
| Comparative Example 8 | 170.8 | 157.1 | 1353 | 2.69 |

(Evaluation Results)

As listed in Table 1 and Table 2, the examples provide low conductivity in a range excellent in short-circuit safety. It is revealed that the reaction resistances are low and secondary batteries with high output and high capacity are obtained. It is also revealed that the positive electrode active materials obtained in the examples have the average degree of circularity within a range capable of obtaining high particle fillability, are high in fillability, and obtain high volume energy densities. It is estimated that the positive electrode active materials obtained in the examples, because Nb is solid-solved in the crystal structure, increase Li diffusibility in bulk and at the interface between the positive electrode active material and the electrolyte solution and provide high output and high capacity owing to resistance reduction. The method for adding Nb may be either solid phase addition or coating; coating provides a slightly higher effect of reducing conductivity than solid phase addition. In view of productivity and the like, solid phase addition is industrially advantageous.

In Comparative Examples 1, 7, and 8, the positive electrode active materials do not obtain a high degree of circularity and target conductivity because Nb is not contained, and the secondary batteries are inferior to the secondary batteries of the examples containing the positive electrode active materials to which Nb has been added in a specific amount in both output characteristics and battery capacity. The positive electrode active material of Comparative Example 2 is high in the degree of circularity because of its large Nb addition amount, but caused the lithium-niobium compound to segregate on the surfaces of the primary particles. Consequently, the secondary batteries are markedly inferior to those of the examples in output characteristics and capacity. In Comparative Example 3, the average degree of circularity is low because of its small Nb addition amount, both output characteristics and battery capacity are inferior to those of the examples, and conductivity is high.

In Comparative Example 4, with high firing temperature, sintering and flocculation progress, resulting in low average degree of circularity and segregation of the lithium-niobium compound. As a result, the secondary batteries are markedly inferior to those of the examples in both output characteristics and capacity. In Comparative Example 5, with low firing temperature, crystal growth does not sufficiently progress, resulting in Nb remaining as a single body and hardly solid-solved in the crystal structure, leading to a large concentration difference between the surfaces of the particles and the central part. As a result, the secondary batteries are markedly inferior to those of the examples in both output characteristics and capacity. In Comparative Example 6, because manganese is not contained, conductivity is high and the average degree of circularity is low.

FIG. 9(A) and FIG. 9(B) are graphs of a relation between a niobium content and conductivity (A) or positive electrode resistance (B) for the positive electrode active materials obtained in Examples 1, 2, 4, and 6 and Comparative Examples 1 to 3 and 6 (Ni molar ratio: 59.1 to 59.9), which were produced on nearly the same condition except the content of Nb. It is clear from the graphs of FIG. 9(A) and FIG. 9(B) that the positive electrode active materials containing niobium in an amount of 0.03 to 3 atom % reduce conductivity and reduce the positive electrode resistance.

Figure 10A:
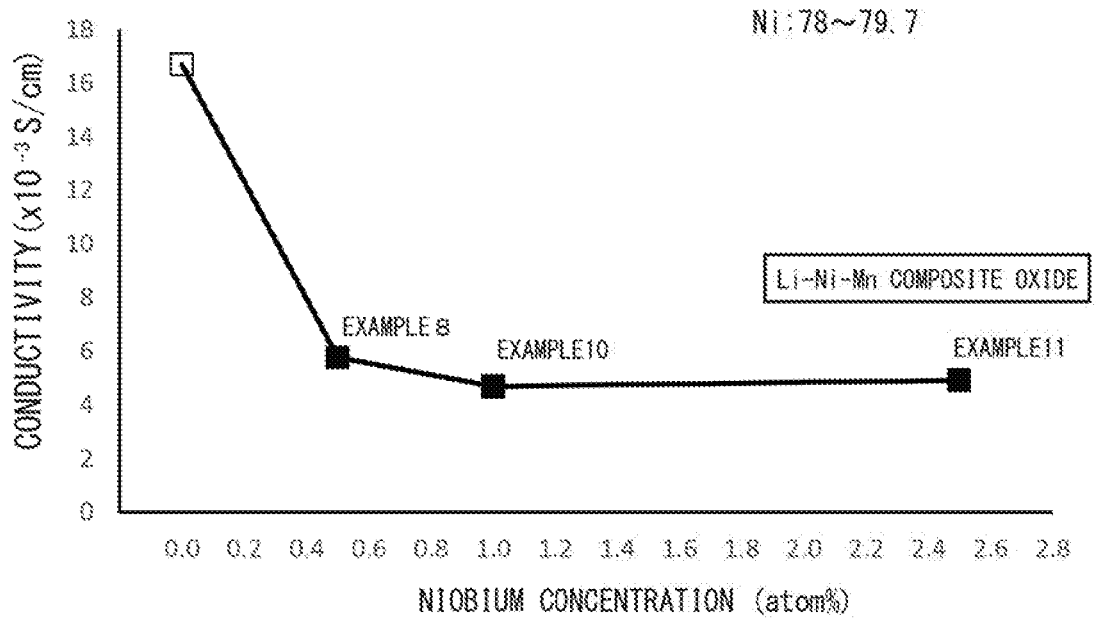
FIGS. 10(A) and 10(B) are graphs of a relation between a niobium content and conductivity FIG. 10(A) or positive electrode resistance FIG. 10(B) for positive electrode active materials obtained in Examples 7, 9, and 10 and Comparative Example 7.
Figure 10B:
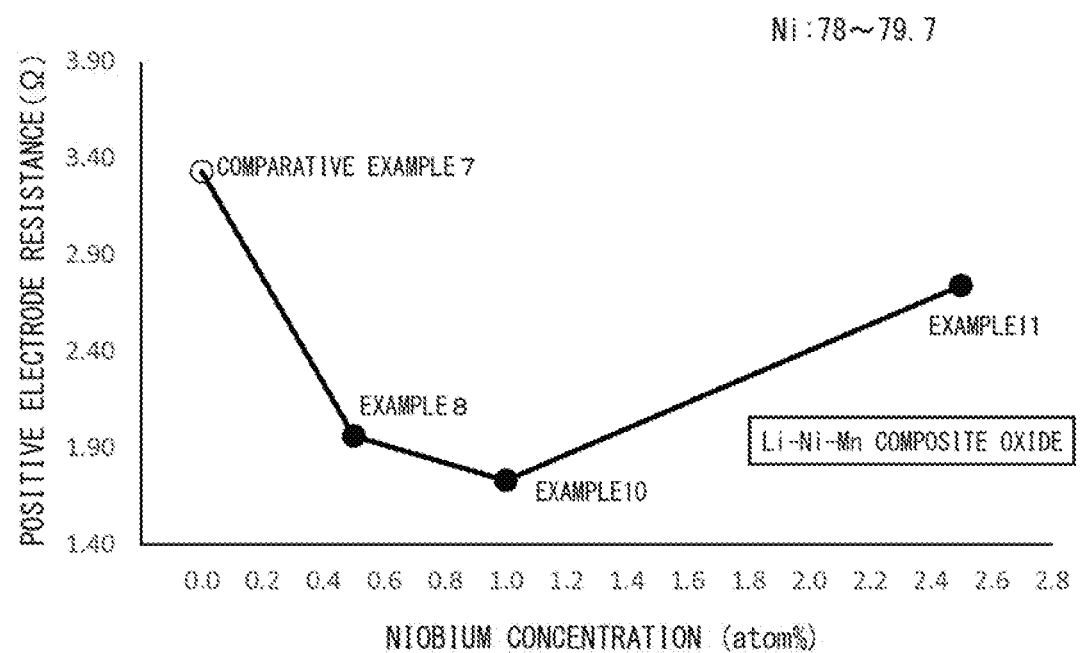

FIG. 10(A) and FIG. 10(B) are graphs of a relation between a niobium content and conductivity (A) or positive electrode resistance (B) for the positive electrode active materials obtained in Examples 8, 10, and 11 and Comparative Example 7 (Ni molar ratio: 78 to 79.7), which were produced on nearly the same condition except the content of Nb. It is clear from the graphs of FIG. 10(A) and FIG. 10(B) that the positive electrode active materials containing niobium in an amount of 0.03 to 3 atom % reduce conductivity and reduce the positive electrode resistance similarly to FIG. 9(A) and FIG. 9(B) even in the composition containing a larger amount of Ni.

INDUSTRIAL APPLICABILITY

In the present embodiment, a positive electrode active material for a nonaqueous electrolyte secondary battery that achieves both high output characteristics and energy density and short-circuit safety can be obtained by an industrial method of production. This nonaqueous electrolyte secondary battery is suitable for power supplies of small-sized portable electronic devices (such as notebook personal computers and cellular phone terminals), which always require high capacity.

The secondary battery of the present embodiment is excellent in safety and is also excellent in output characteristics and capacity compared with conventional batteries containing a positive electrode active material of a lithium-cobalt-based oxide or a lithium-nickel-based oxide. Consequently, it can be reduced in size and increased in output and is suitable as power supplies for electric vehicles subjected to limitation in mounting space The positive electrode active material of the present embodiment and the secondary battery containing the same can be used as not only power supplies for electric vehicles purely driven by electrical energy but also power supplies for what is called hybrid cars, which use combustion engines such as gasoline engines and diesel engines in combination.

The technical scope of the present invention is not limited to the aspects described in the embodiment and the like. One or more of the requirements described in the embodiment and the like may be omitted. The requirements described in the embodiment, and the like can be combined as appropriate. Japanese Patent Application No. 2016-168693 and all the literature cited in this specification are herein incorporated by reference in their entirety to the extent allowed by law.

DESCRIPTION OF REFERENCE SIGNS

CBA Coin-type battery (for evaluation)
PE Positive electrode (electrode for evaluation)
NE Negative electrode
SE Separator
GA Gasket
WW Wave washer
PC Positive electrode can
NC Negative electrode can

The invention claimed is:

1. A positive electrode active material for a nonaqueous electrolyte secondary battery, the positive electrode active material comprising:
a lithium-nickel-manganese composite oxide containing a secondary particle formed of a plurality of flocculated primary particles, wherein
the lithium-nickel-manganese composite oxide is represented by General Formula (1): $Li_dNi_{1-a-b-c}Mn_aM_bNb_cO_{2+\gamma}$ (in General Formula (1), M is at least one element selected from Co, W, Mo, V, Mg, Ca, Al, Ti, Cr, Zr, and Ta; and $0.05 \leq a \leq 0.60$, $0 \leq b \leq 0.60$, $0.0003 \leq c \leq 0.03$, $0.95 \leq d \leq 1.20$, and $0 \leq \gamma \leq 0.5$), at least part of niobium in the lithium-nickel-manganese composite oxide is solid-solved in the primary particles, and a maximum niobium concentration within the primary particles is at least one time and up to three times an average niobium concentration within the primary particles.

2. The positive electrode active material for a nonaqueous electrolyte secondary battery according to claim 1, wherein a minimum niobium concentration within the primary particles is at least 50% of the average niobium concentration within the primary particles.

3. The positive electrode active material for a nonaqueous electrolyte secondary battery according to claim 1, wherein a compound containing lithium and niobium is present at least on part of surfaces of the primary particles.

4. The positive electrode active material for a nonaqueous electrolyte secondary battery according to claim 1, wherein the secondary particle has a volume average particle diameter MV of at east 5 μm and up to 20 μm.

5. The positive electrode active material for a nonaqueous electrolyte secondary battery according to claim 1, wherein the secondary particle has an average degree of circularity E of at least 0.60 and up to 0.98, the degree being determined by the following expression:

$$E = 4\pi S/L^2 \ldots \text{(Expression)}$$

(in the above expression, S is a projected area of the secondary particle, L is a circumferential length of the secondary particle, and π is the ratio of the circumference of a circle to its, diameter).

6. The positive electrode active material for a nonaqueous electrolyte secondary battery according to claim 1, wherein conductivity determined by pressed powder resistance measurement is within a range of at least $1.0 \times 10^{-5}$ S/cm and up to $1.0 \times 10^{-2}$ S/cm.

7. A nonaqueous electrolyte secondary battery comprising:
a positive electrode;
a negative electrode;
a separator; and
a nonaqueous electrolyte solution,
the positive electrode containing the positive electrode active material for a nonaqueous electrolyte secondary battery according to claim 1.

8. A method for producing a positive electrode active material for a nonaqueous electrolyte secondary battery, the positive electrode active material comprising a lithium-nickel-manganese composite oxide represented by General Formula (1): $Li_dNi_{1-a-b-c}Mn_aM_bNb_cO_{2+\gamma}$ (in General Formula (1), M is at least one element selected from Co, W, Mo, V, Mg, Ca, Al, Ti, Cr, Zr, and Ta; and $0.05 \leq a \leq 0.60$, $0 \leq b \leq 0.60$, $0.0003 \leq c \leq 0.03$, $0.95 \leq d \leq 1.20$, and $0 \leq \gamma \leq 0.5$) and containing a secondary particle formed of a plurality of flocculated primary particles, at least part of niobium being solid-solved in the primary particles,
the method comprising:
preparing a lithium-niobium mixture containing one or more selected from nickel-manganese composite hydroxide particles represented by General Formula (2): $Ni_{1-a-b}Mn_aM_b(OH)_{2+\alpha}$ (in Formula (2), M is at least one element selected from Co, W, Mo, V, Mg, Ca, Al, Ti, Cr, Zr, and Ta; and $0.05 \leq a \leq 0.60$, $0 \leq b \leq 0.60$, and $0 \leq \alpha \leq 0.4$) and nickel-manganese composite oxide particles represented by General Formula (3): $Ni_{1-a-b}Mn_aM_bO_{1+\beta}$ (in Formula (3), M is at least one element selected from Co, W, Mo, V, Mg, Ca, Al, Ti, Cr, Zr, and Ta; and $0.05 \leq a \leq 0.60$, $0 \leq b \leq 0.60$, and $0 \leq \beta \leq 0.4$), a niobium compound, and a lithium compound; and
firing the lithium-niobium mixture in an oxidative atmosphere at at least 750° C. and up to 1,000° C. to obtain the lithium-nickel-manganese composite oxide.

9. The method for producing a positive electrode active material for a nonaqueous electrolyte secondary battery according to claim 8, wherein the preparing, comprises:
obtaining the nickel-manganese composite hydroxide particles by crystallization; and
mixing the lithium compound and the niobium compound having an average particle diameter of at least 0.01 μm and up to 10 μm with the nickel-manganese composite hydroxide particles to prepare the lithium-niobium mixture.

10. The method for producing a positive electrode active material for a nonaqueous electrolyte secondary battery according to claim 8, wherein the niobium compound is either one or both of niobic acid and niobium oxide.

11. The method for producing a positive electrode active material for a nonaqueous electrolyte secondary battery according to claim 8, wherein the preparing comprises:
obtaining the nickel-manganese composite hydroxide particles by crystallization;
adding a niobium salt solution and an acid to slurry obtained by mixing the nickel-manganese composite hydroxide particles and water together to obtain nickel-manganese composite hydroxide particles covered with a niobium compound; and
mixing the nickel-manganese composite hydroxide particles covered with a niobium compound and the lithium compound together to prepare the lithium-niobium mixture.

12. The method for producing a positive electrode active material for a nonaqueous electrolyte secondary battery according to claim 8, comprising thermally treating the nickel-manganese composite hydroxide particles at a temperature of at least 105° C., and up to 700° C. before preparing the lithium-niobium mixture, wherein the preparing prepares a lithium-niobium mixture containing either one or both of nickel-manganese composite hydroxide particles and nickel-manganese composite oxide particles obtained by the thermally treating, a niobium compound, and a lithium compound.

* * * * *